(12) United States Patent
Park

(10) Patent No.: US 11,632,049 B2
(45) Date of Patent: Apr. 18, 2023

(54) DC-DC CONVERTER AND DISPLAY DEVICE HAVING THE SAME

(71) Applicant: Samsung Display Co., Ltd., Yongin-si (KR)

(72) Inventor: Sung Chun Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/901,393

(22) Filed: Sep. 1, 2022

(65) Prior Publication Data

US 2022/0416669 A1 Dec. 29, 2022

Related U.S. Application Data

(63) Continuation of application No. 17/236,542, filed on Apr. 21, 2021, now Pat. No. 11,437,912, which is a continuation of application No. 16/680,945, filed on Nov. 12, 2019, now Pat. No. 11,005,375.

(30) Foreign Application Priority Data

Nov. 13, 2018 (KR) .......................... 10-2018-0138661

(51) Int. Cl.
  *H02M 3/335* (2006.01)
  *H02M 3/158* (2006.01)
  *H02M 1/00* (2006.01)

(52) U.S. Cl.
  CPC ....... *H02M 3/33507* (2013.01); *H02M 3/158* (2013.01); *H02M 1/007* (2021.05)

(58) Field of Classification Search
  CPC ...... H02M 1/007; H02M 3/285; H02M 3/335; H02M 3/33507; H02M 3/155; H02M 3/158; H02M 3/1582; H02M 3/1584
  See application file for complete search history.

(56) References Cited

U.S. PATENT DOCUMENTS

| 9,755,517 | B2 | 9/2017 | Kobayashi et al. |
| 11,005,375 | B2 | 5/2021 | Park |
| 11,437,912 | B2 * | 9/2022 | Park .................... H02M 3/1584 |
| 2006/0139974 | A1 | 6/2006 | Dermark |
| 2013/0329474 | A1 | 12/2013 | Barus et al. |

(Continued)

FOREIGN PATENT DOCUMENTS

| KR | 10-2018-0094206 | 8/2018 |
| WO | 2004/109900 | 12/2004 |

*Primary Examiner* — Adolf D Berhane
(74) *Attorney, Agent, or Firm* — Kile Park Reed & Houtteman PLLC

(57) ABSTRACT

A DC-DC converter including a first power supply including a first converter outputting a first power voltage, a first sensor detecting a panel current from an output of the first converter; and a first output group including a plurality of inverting converters outputting a second power voltage based on the panel current; a second power supply including a second converter outputting the first power voltage, and a second output group including a plurality of inverting converters outputting the second power voltage based on the panel current; and a first phase controller controlling operations of the inverting converters included in each of the first and second output groups based on the detected panel current. The second power supply operates when the panel current exceeds a predetermined enable value.

3 Claims, 17 Drawing Sheets

(56) References Cited

U.S. PATENT DOCUMENTS

| | | |
|---|---|---|
| 2016/0125791 A1 | 5/2016 | Park |
| 2016/0293106 A1 | 10/2016 | Seo et al. |
| 2018/0233078 A1 | 8/2018 | Park |
| 2020/0141993 A1 | 5/2020 | Nikic et al. |
| 2020/0274457 A1 | 8/2020 | Kajiyama et al. |
| 2020/0313554 A1 | 10/2020 | Liu et al. |
| 2020/0366098 A1 | 11/2020 | Ganireddy et al. |
| 2020/0381918 A1 | 12/2020 | Siri |

* cited by examiner

DC-DC CONVERTER AND DISPLAY DEVICE HAVING THE SAME

CROSS REFERENCE TO RELATED APPLICATION(S)

This is a continuation application based on currently pending U.S. patent application Ser. No. 17/236,542, filed Apr. 21, 2021, the disclosure of which is incorporated herein by reference in its entirety. U.S. patent application Ser. No. 17/236,542 is a continuation application of U.S. patent application Ser. No. 16/680,945 filed Nov. 12, 2019, now U.S. Pat. No. 11,005,375, issued May 11, 2021, the disclosure of which is incorporated herein by reference in its entirety. U.S. patent application Ser. No. 16/680,945 claims priority benefit of Korean Patent Application 10-2018-0138661 filed Nov. 13, 2018 in the Korean Intellectual Property Office, the disclosure of which is incorporated herein by reference in its entirety for all purposes.

BACKGROUND

Field

Exemplary embodiments of the invention relate generally to display devices and, more specifically, to a DC-DC converter and display devices having the same.

Discussion of the Background

A display device typically includes a DC (direct current)-DC converter that generates power supply voltages necessary for driving the pixels by converting input power supplied from an outside. The DC-DC converter supplies the generated power supply voltages to the pixels through power supply lines.

As the size and/or the displayable luminance of the display panel included in the display device increases, a range of a drive current provided to the display panel may also be increased.

Accordingly, a conversion efficiency of the DC-DC converter designed for a large driving current may be lowered when the display device is driven for the low luminance or the like with a small driving current. In addition, unnecessary power consumption and heat may be increased due to an increase in conduction loss by a relatively large internal resistance or repetitive switching of the DC-DC converter.

The above information disclosed in this Background section is only for understanding of the background of the inventive concepts, and, therefore, it may contain information that does not constitute prior art.

SUMMARY

Exemplary embodiments provide a DC-DC converter including a plurality of power supplies and controlling a plurality of inverting converters based on a panel current.

Exemplary embodiments provide a display device including the DC-DC converter.

Additional features of the inventive concepts will be set forth in the description which follows, and in part will be apparent from the description, or may be learned by practice of the inventive concepts.

An exemplary embodiment of the present invention provides a DC-DC converter including a first power supply including a first converter configured to convert an input power to a first power voltage and to output the first power voltage to a first output terminal, a first sensor configured to detect a panel current from an output of the first converter, and a first output group including a plurality of inverting converters configured to convert the input power to a second power voltage based on the panel current and to output the second power voltage to a second output terminal; a second power supply including a second converter configured to convert the input power to the first power voltage and to output the first power voltage to the first output terminal, and a second output group including a plurality of inverting converters configured to convert the input power to the second power voltage based on the panel current and to output the second power voltage to the second output terminal; and a first phase controller configured to control operations of the inverting converters included in each of the first and second output groups based on the detected panel current. The second power supply may operate when the panel current exceeds a predetermined enable value.

The first output group may include a first inverting converter which is activated from an inactive state when the panel current becomes less than a first enable value, and which is inactivated from an active state when the panel current becomes greater than a first disable value; and a second inverting converter which is activated from an inactive state when the panel current becomes greater than a second enable value, and which is inactivated from an active state when the panel current becomes less than a second disable value. The first disable value may be greater than the first and second enable values, and the second disable value may be less than the first enable value.

The second enable value may be greater than the second disable value and the first enable value.

The second inverting converter may be activated such that the first and second inverting converters generate the second power voltage when the panel current in the activated state of the first inverting converter is in a first overlapping range between the first disable value and the second enable value.

The first inverting converter may be activated such that the first and second inverting converters generate the second power voltage when the panel current in the activated state of the second inverting converter is in a second overlapping range between the first enable value and the second disable value.

The first output group may further include a third inverting converter which is activated from an inactive state when the panel current becomes greater than a third enable value, and which is inactivated from an active state when the panel current becomes less than a third disable value. The third enable value may be greater than the second enable value and the third disable value.

The second output group may include a fourth inverting converter which is activated from an inactive state when the panel current becomes greater than a slave enable value, and which is inactivated from an active state when the panel current becomes less than a slave disable value; and a fifth inverting converter which is activated from an inactive state when the panel current becomes greater than the third enable value, and which is inactivated from an active state when the panel current becomes less than the third disable value.

The slave enable value may be greater than the second enable value and less than the third enable value.

The slave disable value may be greater than the second disable value and less than the third disable value.

Portions of the inverting converters may be activated in the order of the second inverting converter, the fourth inverting converter, and the third inverting converter as the panel current increases, when the panel current is greater than the second enable value.

Driving of the third and fifth inverting converters may be simultaneously controlled.

The second to fifth inverting converters may generate the second power voltage in response to a common control voltage, and the second to fifth inverting converters may share an error amplifier configured to output the control voltage based on the second power voltage.

The second to fifth inverting converters may have the same size.

The size of the first inverting converter may be smaller than a size of the second inverting converter.

The second converter may be activated to generate the first power voltage when the panel current becomes a predetermined converter enable value. The second converter may be inactivated when the panel current becomes a predetermined converter disable value.

The second power supply may further include a second sensor configured to detect the panel current from an output of the second converter.

The DC-DC converter may further include a second phase controller configured to control an operation of the second converter based on a sum of a first panel current detected from the first sensor and a second panel current detected from the second sensor.

The second converter may be driven synchronously with the third and fifth inverting converters.

The first phase controller may be configured to control the operations of first to fifth inverting converters based on a sum of the first panel current and the second panel current.

The first output group may include a first inverting converter configured to output the second power voltage regardless of the panel current; and a second inverting converter which is activated from an inactive state when the panel current becomes greater than a first enable value, and which is inactivated from an active state when the panel current becomes less than a first disable value. The second output group may include a third inverting converter which is activated from an inactive state when the panel current becomes greater than a slave enable value, and which is inactivated from an active state when the panel current becomes less than a slave disable value; and a fourth inverting converter which is activated from an inactive state when the panel current becomes greater than the first enable value, and which is inactivated from an active state when the panel current becomes less than the first disable value.

The first enable value may be different from the first disable value, and the slave enable value may be different from the slave disable value.

As the panel current increases, the second inverting converter may be activated after the third inverting converter is activated. As the panel current decreases, the third inverting converter may be inactivated after the second inverting converter is inactivated.

The fourth inverting converter may be driven synchronously with the second inverting converter.

The first phase controller may include a first synchronization controller configured to drive the third inverting converter in synchronization with a first pulse width modulation (PWM) signal for driving the first inverting converter when the panel current becomes greater than the slave enable value; and a second synchronization controller configured to drive the fourth inverting converter in synchronization with a second PWM signal for driving the second inverting converter when the panel current becomes greater than the first enable value.

Another exemplary embodiment of the present invention provides a DC-DC converter including a first power supply including a first converter configured to convert an input power to a first power voltage and to output the first power voltage to a first output terminal, a first sensor configured to detect a panel current from an output of the first converter, a first inverting converter configured to convert the input power to a second power voltage and to output the second power voltage to a second output terminal when the panel current is less than a first enable value, a second inverting converter configured to output the second power voltage when the panel current becomes greater than a second enable value, and a third inverting converter configured to output the second power voltage when the panel current becomes greater than a third enable value; a second power supply including a second converter configured to output the first power voltage when the panel current becomes greater than the third enable value, a second sensor configured to detect the panel current from an output of the second converter, a fourth inverting converter configured to output the second power voltage when the panel current becomes greater than a slave enable value, and a fifth inverting converter configured to output the second power voltage when the panel current becomes greater than the third enable value; and a phase controller configured to control operations of the first to fifth inverting converters and the second converter based on a change of the panel current, first to third enable values, and the slave enable value. The second power supply may operate when the panel current becomes greater than the slave enable value.

The first inverting converter may be activated to output the second power voltage when the first and second power supplies are started. The first inverting converter may be inactivated when the panel current becomes greater than a first disable value.

The first disable value may be greater than the second enable value. The second inverting converter may be activated such that the first and second inverting converters generate the second power voltage when the panel current in the activated state of the first inverting converter is in a first overlapping range between the first disable value and the second enable value.

Another exemplary embodiment of the present invention provides a display device including a display panel including a plurality of pixels; a driver configured to provide a data signal to the display panel; and a DC-DC converter configured to provide a first power voltage and a second power voltage for driving the pixels based on an input power. The DC-DC converter includes a first power supply including a first converter configured to convert an input power to a first power voltage and to output the first power voltage to a first output terminal, a first sensor configured to detect a panel current from an output of the first converter, a first inverting converter configured to convert the input power to a second power voltage and to output the second power voltage to a second output terminal when the panel current is less than a first enable value, a second inverting converter configured to output the second power voltage when the panel current becomes greater than a second enable value, and a third inverting converter configured to output the second power voltage when the panel current becomes greater than a third enable value; and a second power supply including a second converter configured to output the first power voltage when the panel current becomes greater than the third enable value, a second sensor configured to detect the panel current from an output of the second converter, a fourth inverting converter configured to output the second power voltage when the panel current becomes greater than a slave enable value, and a fifth inverting converter configured to output the second power voltage when the panel current becomes greater than the third enable value. The second power supply may operate when the panel current becomes greater than the slave enable value.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
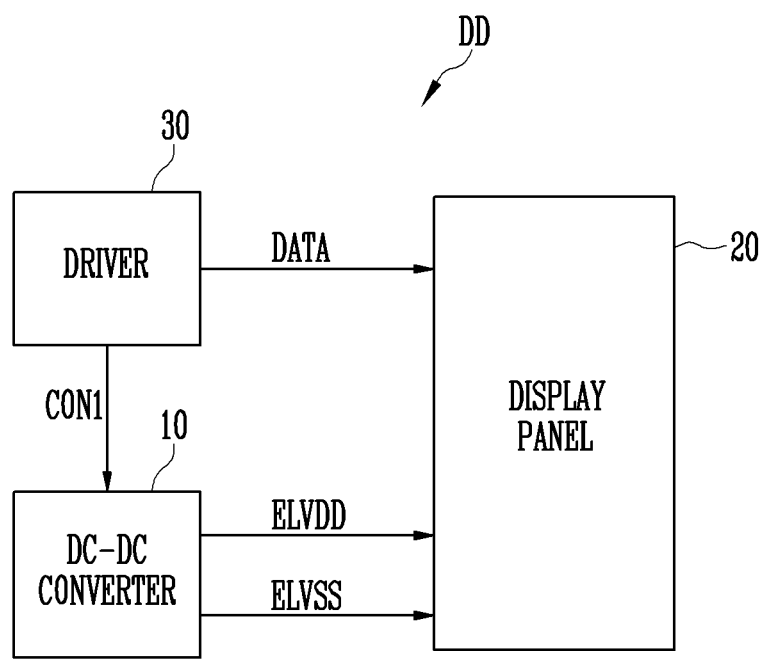
FIG. 1 is a block diagram of a display device according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of a display device according to an exemplary embodiment.

Referring to FIG. 1, the display device DD may include a DC-DC converter 10, a display panel 20, and a driver 30.

The display panel 20 may include a plurality of pixels that operate by receiving a first power voltage ELVDD, a second power voltage ELVSS, and a data signal DATA. In some exemplary embodiments, the second power voltage ELVSS may be smaller than the first power voltage ELVDD. For example, the first power voltage ELVDD may be a positive voltage and the second power voltage ELVSS may be a negative voltage.

The driver 30 may provide the data signal DATA to the display panel 20 and provide the control signal CON1 to the DC-DC converter 10. The driver 30 may include a scan driver, a data driver, and a timing controller, and in some exemplary embodiments, the driver 30 may function as the scan driver, the data driver, and the timing controller.

In some exemplary embodiments, the timing controller and the data driver may be integrated as one driver IC or disposed directly on the display panel 20. The scan driver may be disposed directly on the display panel 20 or may be connected to the display panel 20 in the form of an IC.

The DC-DC converter 10 may generate the power voltages ELVDD and ELVSS for the display panel 20 based on an input power. The first power voltage ELVDD and the second power voltage ELVSS are a high potential voltage and a low potential voltage, respectively, required for driving the pixels.

The DC-DC converter 10 may include a plurality of power supplies. Each of the power supplies may convert a voltage of the input power into the first power voltage ELVDD and a second power voltage ELVSS. In some exemplary embodiments, each of the power supplies may be coupled to the display panel 20 in the form of an IC. For example, the power supplies may be divided into one master power supply and at least one slave power supply.

Each of the power supplies may include a converter outputting the first power voltage ELVDD and a plurality of inverting converters outputting the second power voltage ELVSS.

Each of the power supplies may control the activation (or operation) of the converter and/or the inverting converters according to a panel current (or panel load). For example, when a low panel current is required, the slave power supply portion may be inactivated to reduce power consumption. The panel current may vary depending on a size of the display panel 10, a display luminance, an image size, and the like.

The specific configuration and operation of the DC-DC converter 10 will be described in more detail below with reference to FIGS. 2 to 16.

The display device DD may be an arbitrary display device that displays an image corresponding to the data signal DATA received from the driver 30 using a plurality of power voltages from the DC-DC converter 10. For example, the display device DD may be an organic light emitting display device, and in this case, each of the plurality of pixels may include an organic light emitting diode (OLED). However, the inventive concepts are not limited thereto. For example, the display device DD may be implemented as an active display device including pixels having inorganic light emitting diodes, a liquid crystal display device, a quantum dot display device, and the like.

Figure 2:
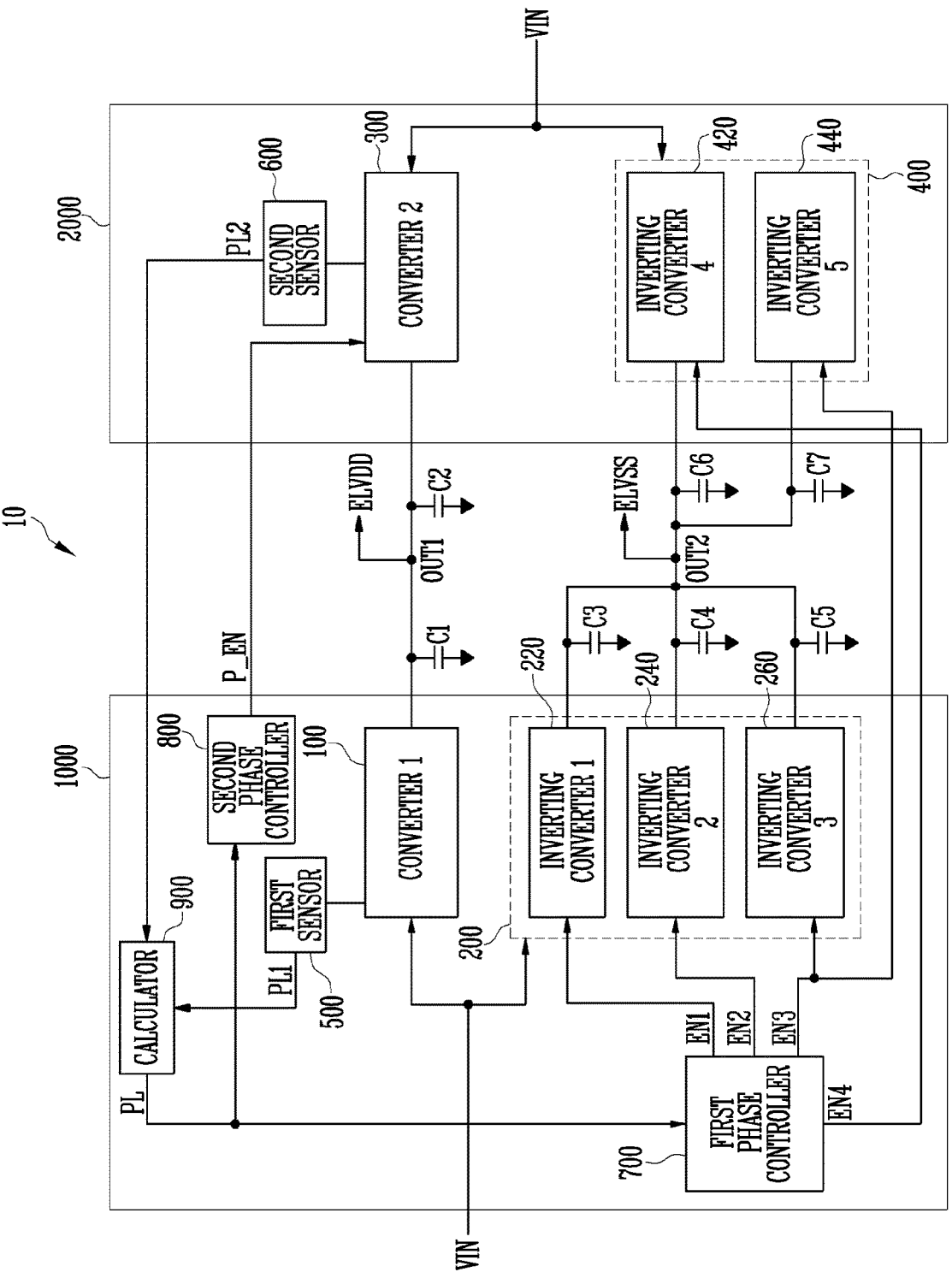
FIG. 2 is a diagram of a DC-DC converter according to an exemplary embodiment.

FIG. 2 is a diagram of a DC-DC converter according to an exemplary embodiment.

Referring to FIG. 2, the DC-DC converter 10 may include a first power supply 1000 and a second power supply 2000.

In some exemplary embodiments, the DC-DC converter 10 may further include first and second phase controllers 700 and 800 for controlling the operation of the first power supply 1000 and the second supply 2000 in accordance with a predetermined phase. The phases may be classified according to the magnitude of the panel current PL.

In some exemplary embodiments, the first power supply 1000 and the second power supply 2000 may each be implemented as separate power supply ICs. For example, physically, the DC-DC converter 10 may include a plurality of power supply ICs each implementing the first power supply 1000 and the second power supply 2000.

In addition, at least a part of the configuration of the first and second phase controllers 700 and 800 may be included in one of the first power supply 1000 and the second power supply 2000. For example, as shown in FIG. 2, the first and second phase controllers 700 and 800 may be included in the first power supply 1000. However, this is merely an example, and the physical arrangement and connection relationship of the structures are not limited thereto.

The first power supply 1000 may include a first converter 100, a first sensor 500, and a first output group 200. The first power supply 1000 may further include a first phase controller 700, a second phase controller 800, and a calculator 900.

The first converter 100 may convert an input power VIN to the first power voltage ELVDD and output the first power voltage ELVDD to a first output terminal OUT1.

In some exemplary embodiments, the first converter 100 may be a boost converter and may boost the input power VIN to the first power voltage ELVDD. The first converter 100 may output the first power voltage ELVDD regardless of the magnitude and the variation of the panel current PL.

The first converter 100 may include a first capacitor C1 between the first output terminal OUT1 and a ground. The first capacitor C1 may stabilize the output of the first power voltage ELVDD.

The first sensor 500 may detect a first panel current PL1 supplied from the first converter 100 to a load (for example, the display panel) during a period in which the first power voltage ELVDD is output. For example, the first sensor 500 may start the sensing operation after a predetermined delay period has elapsed after the start of driving the first converter 100. In some exemplary embodiments, the first panel current PL1 may be provided to the first and second phase controllers 700 and 800, respectively, through a predetermined conversion process.

The first output group 200 may include a plurality of inverting converters. In some exemplary embodiments, the first output group 200 may include first to third inverting converters 220, 240 and 260. The first to third inverting converters 220, 240 and 260 may each include a buck-boost converter. For example, the first to third inverting converters 220, 240 and 260 may output the second power voltage ELVSS by boosting and inverting the input power VIN, respectively.

In some exemplary embodiments, the first inverting converter 220 may convert the input power supply VIN to the second power voltage ELVSS in response to a first enable signal EN1. The first inverting converter 220 may operate only below a predetermined value of the panel current PL. That is, the first inverting converter 220 may operate only when the panel load is low, and may be inactivated when the panel load exceeds a predetermined value. For example, the first inverting converter 220 may operate when the panel current PL is less than a first disable value.

A size of the first inverting converter 220 may be smaller than a size of the second inverting converter 240. A driving capability of the first inverting converter 220 (i.e., the current that the first inverting converter 220 may tolerate) may be proportional to a size of a switching transistors included in the first inverting converter 220. In addition, an inductance of an inductor included in the first inverting converter 220 may be proportional to the size of switching transistors. Therefore, as the size of the switching transistors increases, the current capacity of the inverting converter may increase.

In other words, the driving capability of the second inverting converter 240 may be set higher than the driving capability of the first inverting converter 220. That is, in the case of low current driving, the first inverting converter 220 having relatively small transistors and inductors is used, so that conduction losses caused by the transistor and the inductor may be reduced, and the voltage conversion efficiency may be increased.

In some exemplary embodiments, the first inverting converter 220 may be activated at initial startup of the DC-DC converter 10. For example, the first inverting converter 220 may output the second power voltage ELVSS through a "soft start" after the DC-DC converter 10 is started. That is, when a predetermined delay time elapses after the first power voltage ELVDD is output, the first inverting converter 220 may output the second power voltage ELVSS. A circuit for a soft start may be provided only in the first inverting converter 220 of the inverting converters.

The first inverting converter 220 may include a third capacitor C3 between a second output terminal OUT2 and the ground. The third capacitor C3 may stabilize the output of the second power voltage ELVSS.

The second inverting converter 240 may convert the input power VIN to the second power voltage ELVSS in response to a second enable signal EN2. The second inverting converter 240 may operate when the panel current PL exceeds a predetermined value. The first inverting converter 220 and the second inverting converter 240 may operate under different conditions of the panel current PL. However, to stabilize the output of the second power voltage ELVSS, both the first and second inverting converters 220 and 240 may be activated in a specific panel current range in which the operations of the first inverting converter 220 and the second inverting converter 240 are switched.

The second inverting converter 240 may include a fourth capacitor C4 between the second output terminal OUT2 and the ground. The fourth capacitor C4 may stabilize the output of the second power voltage ELVSS.

The third inverting converter 260 may convert the input power VIN to the second power voltage ELVSS in response to a third enable signal EN3. The third inverting converter 260 may operate when the panel current PL exceeds a predetermined value in a state where the second inverting converter 240 is activated. That is, the third inverting converter 260 may operate only when the second inverting converter 240 is activated.

The third inverting converter 260 may include a fifth capacitor C5 between the second output terminal OUT2 and the ground. The fifth capacitor C5 may stabilize the output of the second power voltage ELVSS.

The second power supply 2000 may include a second converter 300, a second sensor 600, and a second output group 400. In some exemplary embodiments, the second power supply 2000 may further include a first phase controller 700, a second phase controller 800, and a calculator 900.

The second converter 300 may convert the input power VIN to the first power voltage ELVDD and output the first power voltage ELVDD to the first output terminal OUT1. In some exemplary embodiments, the second converter 300 may be a boost converter. For example, the first converter 100 and the second converter 300 may have substantially the same configuration. In some exemplary embodiments, the second converter 300 may output the first power voltage ELVDD regardless of the magnitude and variation of the panel current PL.

In some exemplary embodiments, the second converter 300 may operate only when the panel current PL exceeds a predetermined value. For example, the second converter 300 may convert the input power VIN to the first power voltage ELVDD in response to a converter enable signal P_EN.

The second converter 300 may include a second capacitor C2 between the first output terminal OUT1 and the ground. The second capacitor C2 may stabilize the output of the first power voltage ELVDD.

The second sensor 600 may detect a second panel current PL2 supplied from the second converter 300 to the load (for example, the display panel) during the period in which the first power voltage ELVDD is output. For example, the second sensor 600 may start the sensing operation after a predetermined delay period has elapsed after the second converter 300 starts driving. In some exemplary embodiments, the second panel current PL2 may be provided to the first and second phase controllers 700 and 800, respectively, through a predetermined conversion process.

The second sensor 600 may perform the detection operation only when the second converter 300 outputs the first power voltage ELVDD.

The second output group 400 may include a plurality of inverting converters. In some exemplary embodiments, the second output group 400 may include fourth and fifth inverting converters 420 and 440. In some exemplary embodiments, the first to fifth inverting converters 220, 240, 260, 420, and 440 may have substantially the same or similar configuration.

In some exemplary embodiments, the second to fifth inverting converters 240, 260, 420, and 440 may have substantially the same size. For example, the second to fifth inverting converters 240, 260, 420, and 440 may have substantially the same driving capability. That is, the second to fifth inverting converters 240, 260, 420, and 440 have the same structure, and include the transistors and the inductors of the same size, so that the inductor current can be controlled uniformly. Therefore, the second power voltage ELVSS may be stably output even when the inverting converters are sequentially turned on/off.

Since this is an example, at least one of the second to fifth inverting converters 240, 260, 420, and 440 may have different sizes depending on the driving method or the driving sequence.

The fourth inverting converter 420 may convert the input power VIN to the second power voltage ELVSS in response to a fourth enable signal EN4. The fourth inverting converter 420 may operate when the panel current PL exceeds a predetermined value in a state where the second inverting converter 240 is activated. That is, the fourth inverting converter 420 may operate only when the second inverting converter 240 is activated. The fourth inverting converter 420 may include a sixth capacitor C6 between the second output terminal OUT2 and the ground.

The fifth inverting converter 440 may convert the input power VIN to the second power voltage ELVSS in response to a fifth enable signal (e.g., the third enable signal EN3). The fifth inverting converter 440 may operate when the panel current PL exceeds a predetermined value in a state where the second inverting converter 240 is activated. The fifth inverting converter 440 may include a seventh capacitor C7 between the second output terminal OUT2 and the ground.

In some exemplary embodiments, the fifth enable signal may be the same as the third enable signal EN3. In this case, the third inverting converter 260 and the fifth inverting converter 440 may be controlled simultaneously. That is, the third inverting converter 260 and the fifth inverting converter 440 may be simultaneously activated and deactivated at the same time.

The first phase controller 700 may control the first to fifth inverting converters 220, 240, 260, 420, and 440 included in the first and second output groups 200 and 400 based on the detected panel current PL, respectively. The first phase controller 700 may generate the first to fourth enable signals EN1, EN2, EN3, and EN4 by comparing the panel current PL with a predetermined plurality of threshold values.

For example, the threshold values may correspond to a current value that activates or deactivates each of the first to fifth inverting converters 220, 240, 260, 420, and 440.

The second phase controller 800 may control the operation of the second converter 300 based on the detected panel current PL. The second phase controller 800 may generate the converter enable signal P_EN by comparing the panel current PL with a predetermined threshold value. In some exemplary embodiments, the second sensor 600 may operate in response to the converter enable signal P_EN. For example, the second sensor 600 may perform current sensing only when the second converter 300 is operating.

In some exemplary embodiments, the first and second phase controllers 700 and 800 may be included in the first power supply 1000. The operation of the second power supply 2000 may be controlled by the first and second phase controller 700 and 800. For example, the first power supply 1000 may be a master power supply (or a master power supply IC), and the second power supply 2000 may be a slave power supply (or a slave power supply IC).

The second power supply 2000 may be activated only when the panel current PL exceeds a predetermined threshold value.

As described above, the display device DD and the DC-DC converter 10 according to the exemplary embodiments may control the first to third inverting converters 220, 240, and 260 of the first power supply 1000 and the second power supply 2000 according to the panel current PL, so that the heat generation and the power consumption may be reduced and the conversion efficiency for the power voltage may be improved.

Furthermore, the DC-DC converter 10 may further include the first inverting converter 220 that is driven only at the initial start-up time and/or the low current drive range, so that the power consumption and voltage conversion efficiency may be further improved.

Figure 3:
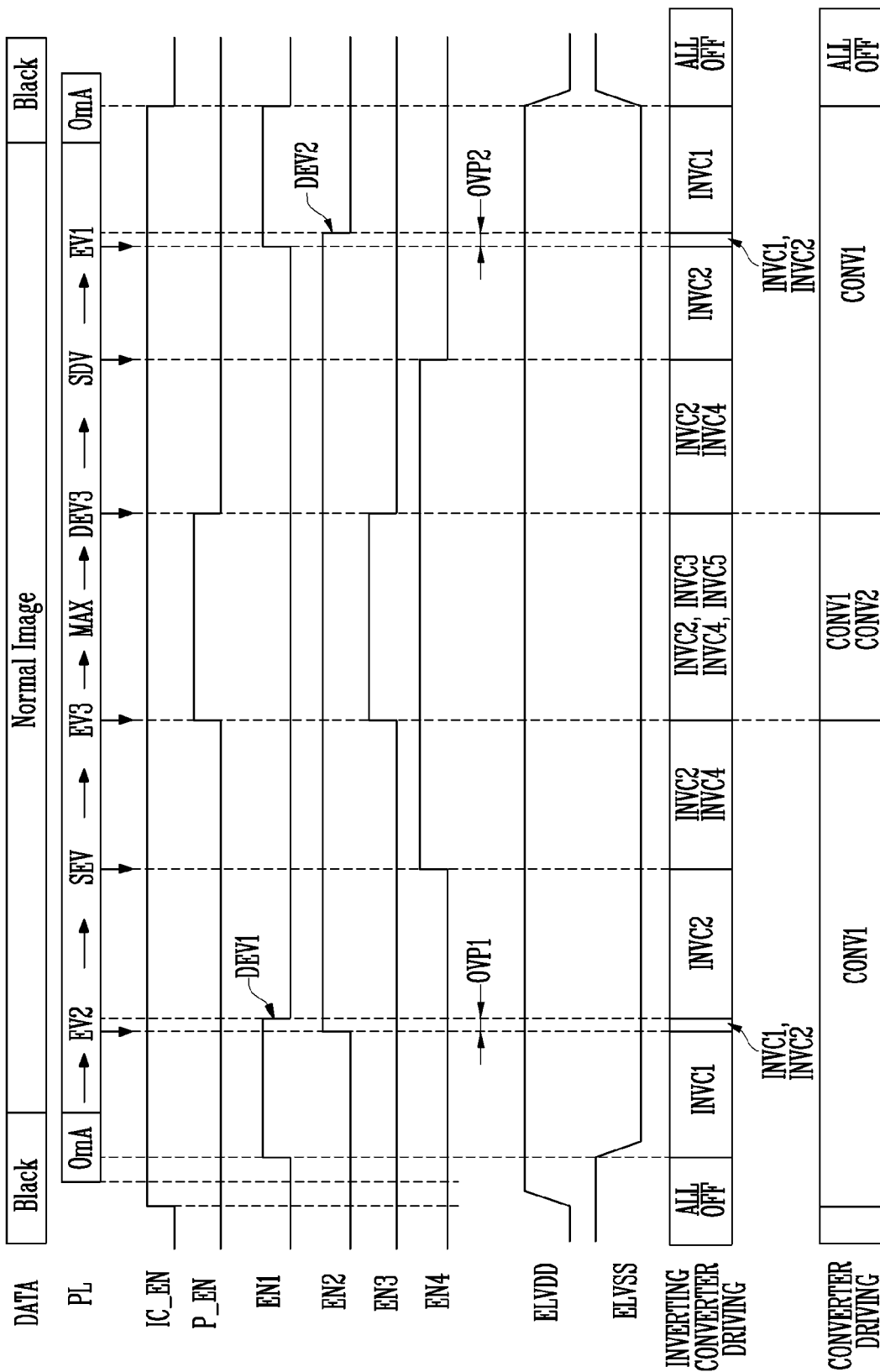
FIG. 3 is an exemplary timing diagram illustrating an operation of the DC-DC converter of FIG. 2.

FIG. 3 is a timing diagram illustrating an example of an operation of the DC-DC converter of FIG. 2.

Referring to FIGS. 2 and 3, the DC-DC converter 10 may control driving (or activation) of the first to third inverting converters 220, 240, and 260 in the first power supply 1000 and the second power supply 2000 in accordance with the panel current PL.

A logic high level of each control signal in FIG. 3 may be an activation level that activates a corresponding component. FIG. 3 shows a timing diagram in a case where the panel current rises from 0 mA to a maximum value (maximum panel current) MAX and falls again from the maximum value MAX to 0 mA.

An IC enable signal IC_EN is a signal for starting the DC-DC converter 10. In response to the IC enable signal IC_EN, the first power supply 1000 starts driving (generating the power voltages ELVDD and ELVSS). For example, the first converter 100 (denoted as CONV1 in FIG. 3) may generate the first power voltage ELVDD in response to the IC enable signal IC_EN.

In some exemplary embodiments, the first sensor 500 may start the sensing operation after a predetermined delay period has elapsed after the start of driving the first converter 100.

Thereafter, the first enable signal EN1 may have the activation level, and the first inverting converter 220 (denoted as INVC1 in FIG. 3) may be activated. In some exemplary embodiments, the first inverting converter 220 may output the second power voltage ELVSS through a soft start when the DC-DC converter 10 is initially activated.

Hereinafter, enable values EV1, EV2, EV3, and SEV and disable values DEV1, DEV2, DEV3, and SDV described below can be understood as current values that are compared with the panel current PL.

The first inverting converter 220 in the active state may be inactivated when the panel current PL becomes greater than the first disable value DEV1. That is, the first inverting converter 220 may operate in response to a relatively low panel current PL. In one example, the first disable value DEV1 may be about 200 mA.

When the panel current PL becomes smaller than the first enable value EV1, the first inverting converter 220 in the inactive state may be activated again. The first disable value DEV1 and the first enable value EV1 may have a hysteresis relationship. For example, the first enable value EV1 may be less than the first disable value DEV1 by about 50 mA. That is, the first enable value EV1 may be about 150 mA when the first disable value DEV1 is about 200 mA. The on/off criterion for the first inverting converter 220 is set differently. Therefore, it is possible to prevent the first inverting converter 220 from unnecessarily turning on and/or off when the panel current PL varies finely near 200 mA.

When the panel current PL is greater than the second enable value EV2, the second enable signal EN2 may have the activation level and the second inverting converter 240 (denoted as INVC2 in FIG. 3) may be activated.

In some exemplary embodiments, the second enable value EV2 may be less than the first disable value DEV1. That is, the panel current PL may have a first overlapping range OVP1 between the second enable value EV2 and the first disable value DEV1. The first and second inverting converters 220 and 240 may all generate the second power voltage ELVSS when the panel current PL is included in the first overlapping range OVP1 in the active state of the first inverting converter 220. The first enable signal EN1 and the second enable signal EN2 may overlap in the first overlapping range OVP1.

The first inverting converter 220 may be turned off (inactivated) after the second inverting converter 240 is activated to generate the second power voltage ELVSS. Therefore, the second power voltage ELVSS may be stably supplied.

When the panel current PL becomes less than the second disable value DEV2, the second enable signal EN2 may have the inactivation level and the second inverting converter 240 in the activated state may be deactivated. In some exemplary embodiments, the second disable value DEV2 may be less than the first enable value EV1. For example, the second disable value DEV2 may be about 140 mA.

Accordingly, the panel current PL may have a second overlapping range OVP2 between the first enable value EV1 and the second disable value DEV2. When the panel current PL is included in the second overlapping range OVP2 in the active state of the second inverting converter 240, both the first and second inverting converters 220 and 240 may generate the second power voltage ELVSS. The first enable signal EN1 and the second enable signal EN2 may overlap in the second overlapping range OVP2.

The second inverting converter 240 may be turned off (inactivated) after the first inverting converter 220 is activated to generate the second power voltage ELVSS. Therefore, the second power voltage ELVSS may be stably supplied.

When the panel current PL becomes greater than the slave enable value SEV, the fourth enable signal EN4 may have the activation level and the fourth inverting converter 420 (shown as INVC4 in FIG. 3) may be activated. Since the fourth inverting converter 420 is included in the second power supply 2000, the operation of the second power supply 2000 may be started by the fourth enable signal EN4.

The slave enable value SEV may be between the second enable value EV2 and the third enable value EV3. In an example, the slave enable value SEV may be about 500 mA.

When the panel current PL becomes less than the slave disable value SDV, the fourth enable signal EN4 may have the inactivation level and the fourth inverting converter 420 in the activated state may be inactivated. In some exemplary embodiments, the slave disable value SDV may be less than the slave enable value SEV. For example, the slave enable value SEV may be about 500 mA and the slave disable value SDV may be about 450 mA. That is, the on/off criterion for the fourth inverting converter 420 is set differently. Therefore, it is possible to prevent the fourth inverting converter 420 from unnecessarily turning on and/or off.

When the panel current PL becomes greater than the third enable value EV3, the third enable signal EN3 may have the activation level and the third and fifth inverting converters 260 and 440 (shown as INVC3 and INVC5 in FIG. 3) in the inactive state may be activated. When the panel current PL becomes greater than the third enable value EV3, the converter enable signal P_EN may have the activation level and the second converter 300 (shown as CONV2 in FIG. 3) may be activated. The third enable value EV3 may be about 1 A.

When the panel current PL becomes less than the third disable value DEV3, the third enable signal EN3 may have the inactivation level and the third and fifth inverting converters 260 and 440 in the activated state may be inactivated. Further, when the panel current PL becomes less than the third disable value DEV3, the converter enable signal P_EN may have the inactivation level and the second converter 300 may be inactivated.

In this manner, the second converter 300, the third inverting converter 260, and the fifth inverting converter 440 may be driven synchronously with each other in response to the panel current PL.

In some exemplary embodiments, the third disable value DEV3 may be less than the third enable value EV3. For example, the third enable value EV3 may be about 1 A, and the third disable value DEV3 may be about 950 mA.

The inverting converters may be activated in the order of the second inverting converter 240 of the first power supply 1000, the fourth inverting converter 420 of the second power supply 2000, and the third inverting converter 260 of the first power supply 1000 as the panel current PL increases, when the panel current PL is greater than the second enable value EV2. The third inverting converter 260 and the fifth inverting converter 440 may be activated at the same time.

Likewise, when the panel current PL is greater than the third enable value EV3, the inverting converters may be sequentially deactivated in the reverse order of the activation sequence as the panel current PL decreases. That is, the third inverting converter 260 of the first power supply 1000, the fourth inverting converter 420 of the second power supply 2000, and the second inverting converter 240 of the first power supply 1000 may be sequentially inactivated as the panel current decreases. The third inverting converter 260 and the fifth inverting converter 440 may be inactivated at the same time.

Inductor currents of the inverting converters may be balanced and the second power voltage ELVSS may be stably output as the inverting converters 240, 260, and 420 are driven in the order according to the increase and/or decrease of the panel current PL. Further, the voltage conversion efficiency, the power consumption and the heat generation may be improved by applying the optimized power voltage generation drive based on the panel current PL to the DC-DC converter 10.

Also, in the case of the low current driving, conduction losses caused by the transistor and the inductor may be reduced and the voltage conversion efficiency may be increased by using the first inverting converter 220 having small transistors and inductors.

The plurality of power supplies 1000 and 2000 are connected in a dependent manner so that the first and second converters 100 and 300 distribute the current for generating the first power voltage ELVDD and the inverting converters 220, 240, 260, 420, and 440 distribute the current for generating the second power voltage ELVSS. Thus, the DC-DC converter 10 according to exemplary embodiments may be effectively applied to a wide driving current range.

Figure 4:
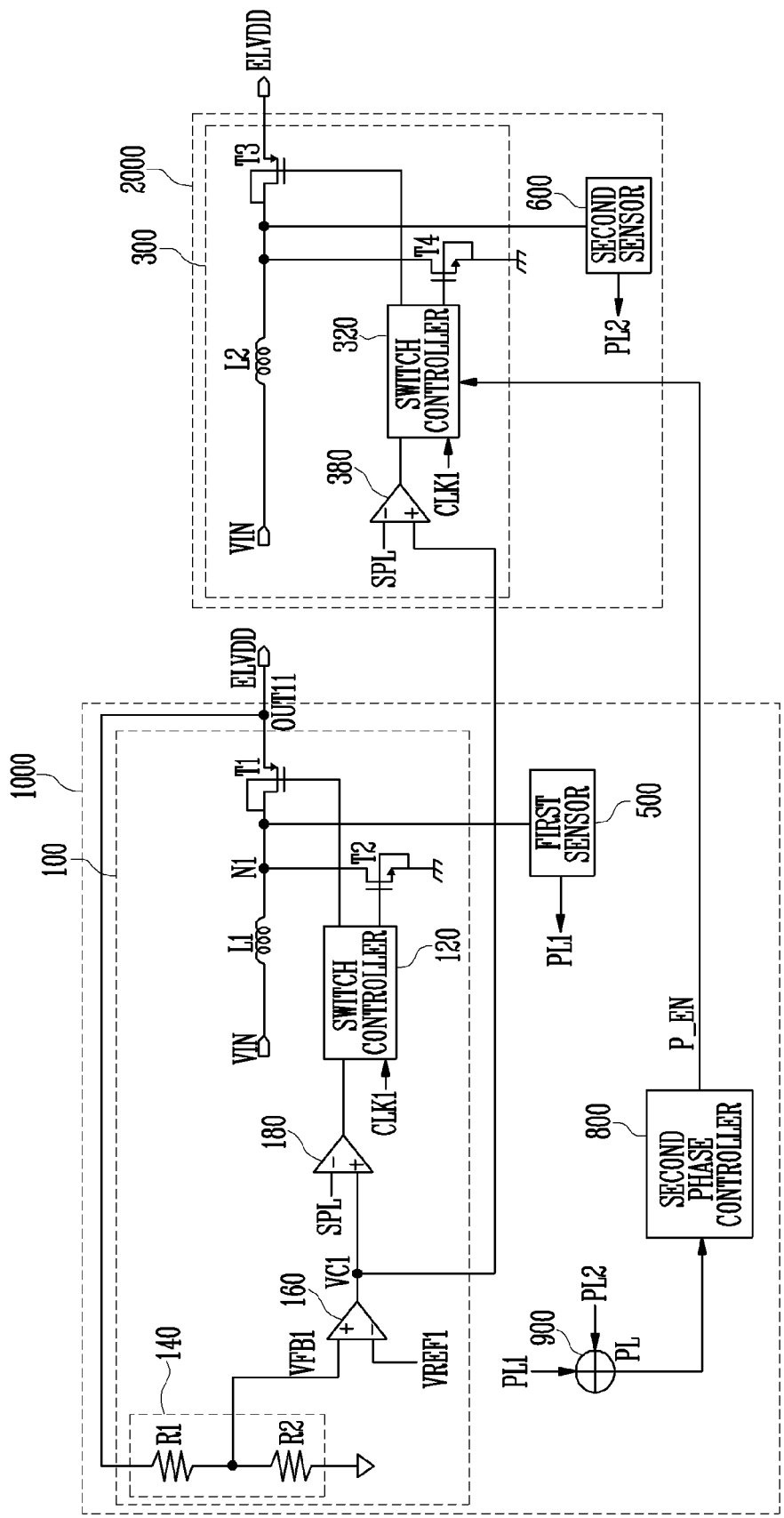
FIG. 4 is a diagram of first and second converters included in the DC-DC converter of FIG. 2.

FIG. 4 is a diagram illustrating an example of first and second converters included in the DC-DC converter of FIG. 2.

Referring to FIGS. 2 to 4, the DC-DC converter 10 may include the first power supply 1000 and the second power supply 2000.

The first power supply 1000 may include a first converter 100, a first sensor 500, and a second phase controller 800.

The first converter 100 may include a first inductor L1, a first transistor T1, a second transistor T2, and a switch controller 120.

The first transistor T1 may be coupled between a first node N1 and the first output terminal OUT1 through which the first power voltage ELVDD is output. The first transistor T1 may be turned on alternately with the second transistor T2.

The second transistor T2 may be coupled between the first node N1 and the ground. A current may flow through the first inductor L1 by the turn-on of the second transistor T2.

Therefore, after the second transistor T2 is turned on and an electromotive force is generated in the first inductor L1, the first transistor T1 is turned on so that the input power VIN may be converted into the first power voltage ELVDD.

The switch controller 120 may control on/off of the first and second transistors T1 and T2 in response to a PWM (pulse width modulation) signal and a clock signal CLK1. The first and second transistors T1 and T2 may be alternately turned on and off under the control of the switch controller 120.

The first converter 100 may further include a first voltage divider 140, a first error amplifier 160, and a first comparator 180.

The first voltage divider 140 may be connected to an output terminal OUT11 of the first converter 100. The first voltage divider 140 may generate a first feedback voltage VFB1 by dividing the first power voltage ELVDD output from the first converter 100. In some exemplary embodiments, the first voltage divider 140 may include a plurality of resistors R1 and R2 coupled to the output terminal OUT11 of the first converter 100.

The first error amplifier 160 may output a first control voltage VC1 by amplifying a difference between the first feedback voltage VFB1 and a first reference voltage VREF1. A level of the first control voltage VC1 may vary depending on the difference between the first feedback voltage VFB1 and the first reference voltage VREF1.

The first comparator 180 may output a PWM signal based on a difference between the panel current PL and the first control voltage VC1. For example, the first comparator 180 may be a PWM signal generator. In this case, the panel current PL may be converted into a sawtooth wave SPL type by a predetermined conversion process and may be provided to the first comparator 180. A square wave PWM signal may be output by comparing the first control voltage VC1 and the sawtooth wave SPL.

A pulse width (frequency) and/or phase of the PWM signal may be determined according to the level of the first control voltage VC1.

In some exemplary embodiments, the first control voltage VC1 may be supplied to the second converter 300 in common. The first voltage divider 140, the first error amplifier 160 and the first comparator 180 may be commonly used for the first and second converters 100 and 300. That is, the second converter 300 does not include any of the first voltage divider 140, the first error amplifier 160, and the first comparator 180. Thus, balancing of the inductor currents of the first converter 100 and the second converter 300 may be improved.

The first sensor 500 may detect the first panel current PL1 from the output of the first converter 100. In some exemplary embodiments, the first sensor 500 may be coupled to one or both ends of the first transistor T1. The first sensor 500 may detect an inductor current flowing from the first inductor L1 to the first transistor T1 when the first transistor T1 is turned on. The first sensor 500 may be implemented as a combination of an amplifier and a low-pass filter.

The first converter 100 may output the first power voltage ELVDD regardless of the magnitude and the variation of the panel current PL.

The second power supply 2000 may include the second converter 300 and the second sensor 600.

The configuration of the second converter 300 may be substantially the same as that of the first converter 100. For example, the second converter 300 may include a second inductor L2, a third transistor T3, a fourth transistor T4, a switch controller 320, and a second comparator 380. The second inductor L2, the third transistor T3, the fourth transistor T4, the switch controller 320, and the second comparator 380 may correspond to the first inductor L1, the first transistor T1, the second transistor T2, the switch controller 120, and the first comparator 180, respectively.

The second converter 300 may be driven based on the first control voltage VC1 by the output feedback of the first converter 100. That is, the first converter 100 and the second converter 300 may share the first voltage divider 140 and the first error amplifier 160.

Additionally, the second converter 300 may output the first power voltage ELVDD in response to the converter enable signal P_EN.

In some exemplary embodiments, the first converter 100 and the second converter 300 may be synchronized by the clock signal CLK1 supplied to the switch controllers 120 and 320 to generate inductor currents. That is, when both of the first and second converters 100 and 300 are activated, the operations of the first converter 100 and the second converter 300 may be synchronized, and thus, a stable first power voltage ELVDD may be output.

The second sensor 600 may have substantially the same configuration as the first sensor 500. The second sensor 600 may detect the second panel current PL2 from the output of the second converter 300. In some exemplary embodiments, the second sensor 600 may be connected to one or both ends of the third transistor T3. The second sensor 600 may perform a sensing drive depending on the driving of the second converter 300. For example, the second sensor 600 may be driven only within a current range in which the second converter 300 outputs the first power voltage ELVDD.

In some exemplary embodiments, the second phase controller 800 may be included in the first power supply 1000. The second phase controller 800 may generate the converter enable signal P_EN based on the first panel current PL1 and the second panel current PL2. The converter enable signal P_EN may be activated in response to the converter enable value and may be inactivated in response to the converter disable value. For example, as shown in FIG. 3, the converter enable signal P_EN may be activated corresponding to the third enable value EV3. In one example, the converter enable value may be equal to the third enable value EV3, and the converter disable value may be equal to the third disable value DEV3. However, this is merely an example, and the transition reference of the converter enable signal P_EN is not limited thereto.

The second converter 300 in the inactive state may operate only in a predetermined panel current range, based on the converter enable signal P_EN.

In some exemplary embodiments, the first power supply 1000 may include a calculator 900 for synthesizing the first panel current PL1 and the second panel current PL2 and supplying synthesized value to the first and second phase controllers 700 and 800. For example, the calculator 900 may include an adder, and may output a sum of the first panel current PL1 and the second panel current PL2 as the panel current PL.

Figure 5:
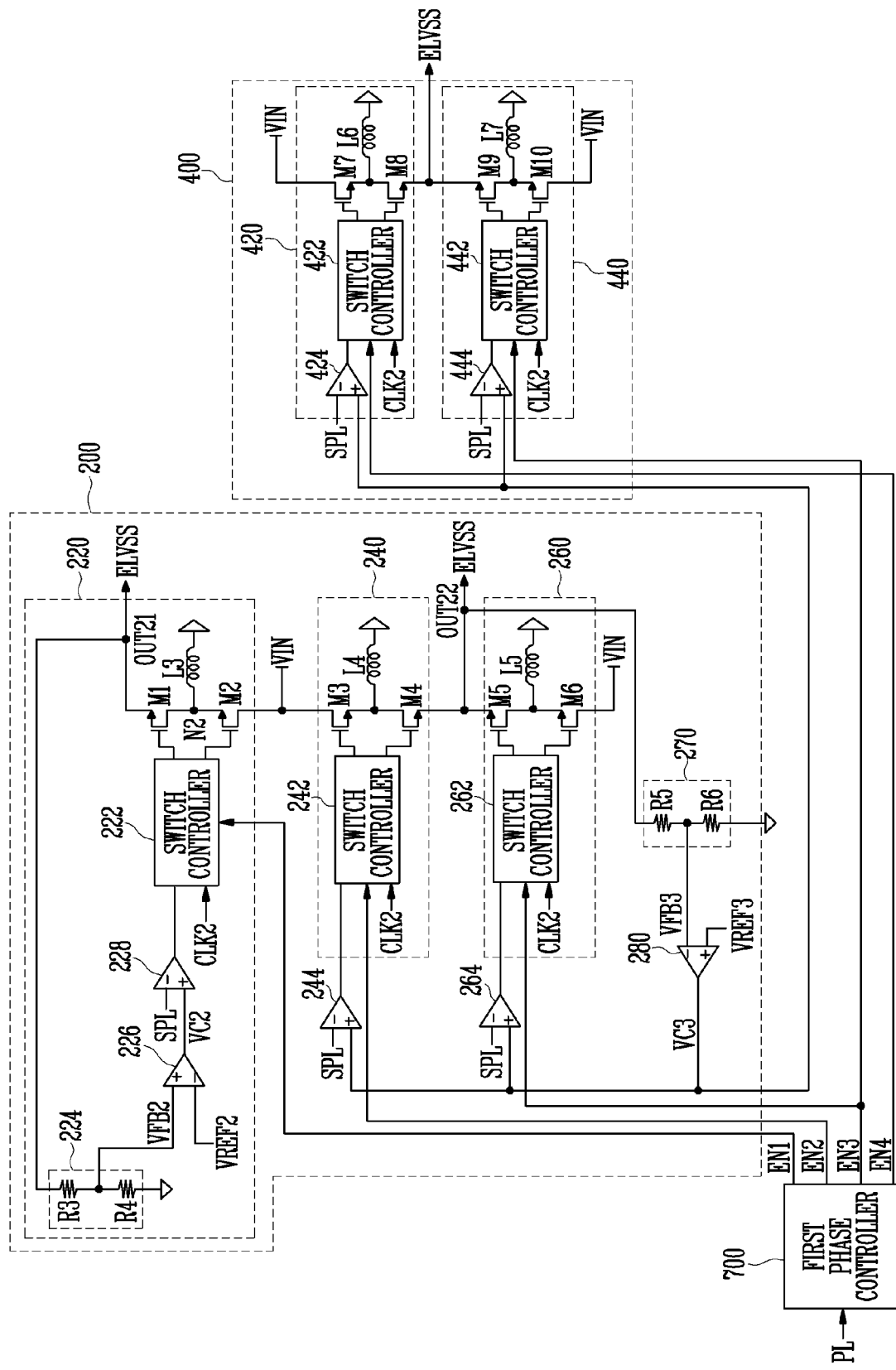
FIG. 5 is a diagram illustrating first and second output groups included in the DC-DC converter of FIG. 2.

FIG. 5 is a diagram illustrating an example of first and second output groups included in the DC-DC converter of FIG. 2.

Referring to FIGS. 2 to 5, the first power supply 1000 may further include the first output group 200 and the first phase controller 700 and the second power supply 2000 may further include the second output group 400.

The first output group 200 may include first to third inverting converters 220, 240, and 260. The first inverting converter 220 may be an inverting converter for driving the low current which operates only below the first disable value DEV1. The second and third converters 240 and 260 may be sequentially activated in a relatively high panel current condition in which the first inverting converter 220 is not operating.

The first inverting converter 220 may include a first transistor M1, a second transistor M2, a third inductor L3, a switch controller 222, a second voltage divider 224, a second error amplifier 226, and a second amplifier 228.

The first transistor M1 may be coupled between a second node N2 and an output terminal OUT21 for outputting the second power voltage ELVSS. The first transistor M1 may be turned on alternately with the second transistor M2.

The second transistor M2 may be coupled between the input power VIN and the second node N2. The second transistor M2 may control the current to flow through the third inductor L3.

Therefore, after the second transistor M2 is turned on and an electromotive force is generated at the third inductor L3, the first transistor M1 may turned on. Thus, the input power VIN may be inverted into the second power voltage ELVSS.

The second node N2 may be defined as a common node of the first transistor M1, the second transistor M2, and the third inductor L3.

In some exemplary embodiments, the arrangement and configuration of the transistors M3 to M10 and inductors L4 to L7 of the second to fifth inverting converters 240, 260, 420 and 440 are the same as those of the first inverting converter 220.

In some exemplary embodiments, the fourth inverting converter 420 may include a seventh transistor M7, an eighth transistor M8, a sixth inductor L6, a switch controller 422, and a third comparator 424.

In some exemplary embodiments, the fifth inverting converter 440 may include a ninth transistor M9, a tenth transistor M10, a seventh inductor L7, a switch controller 442, and a fourth comparator 444.

The second voltage divider 224 may be connected to the output terminal OUT21 of the first inverting converter 220. The second voltage divider 224 may divide the second power voltage ELVSS output from the first inverting converter 220 to generate a second feedback voltage VFB2.

The second error amplifier 226 may output a second control voltage VC2 by amplifying a difference between the second feedback voltage VFB2 and a second reference voltage VREF2.

The second comparator 228 may output a square wave PWM signal by comparing the panel current PL with a sawtooth wave SPL and the second control voltage VC2.

The switch controller 222 may control the output of the first inverting converter 220 in response to the PWM signal, the clock signal CLK2, and the first enable signal EN1. In some exemplary embodiments, the first inverting converter 220 may output the second power voltage ELVSS only when the first enable signal EN1 is activated.

The second to fifth inverting converters 240, 260, 420, and 440 may have a configuration similar to that of the first inverting converter 220. Thus, the second to fifth inverting converters 240, 260, 420, and 440 may be driven in a manner similar to the first inverting converter 220.

The second to fifth inverting converters 240, 260, 420, and 440 may share a third voltage divider 270 and a third error amplifier 280.

In some exemplary embodiments, the third voltage divider 270 and the third error amplifier 280 may be included in the first power supply 1000. For example, the third voltage divider 270 may be connected to an output terminal OUT22 of the second inverting converter 240.

The configurations of the third voltage divider 270 and the third error amplifier 280 may be substantially the same as those of the second voltage divider 224 and the second error amplifier 226, respectively.

In some exemplary embodiments, the size of the second inverting converter 240 may be greater than the size of the first inverting converter 220. For example, the third and fourth transistors M3 and M4 may be larger than the first and second transistors M1 and M2, and the fourth inductor L4 may be larger than the third inductor L3. That is, the driving capability of the second inverting converter 240 may be set higher than the driving capability of the first inverting converter 220.

Therefore, in the case of low-current driving, since only the first inverting converter 220 designed to have a small transistor and inductor is used, the conduction loss caused by the transistor and the inductor can be reduced and the voltage conversion efficiency can be increased.

In some exemplary embodiments, the sizes of the second to fifth inverting converters 240, 260, 420, 440 may be substantially the same. Accordingly, even though the second to fifth inverting converters 240, 260, 420, and 440 are sequentially activated, the respective inductor currents may be balanced. Therefore, the second power voltage ELVSS may be stably output even when the second to fifth inverting converters 240, 260, 420, and 440 are sequentially turned on and off.

The first phase controller 700 may output the first to fourth enable signals EN1 to EN4 based on the panel current PL. The operation of the first to fifth inverting converters 220, 240, 260, 420, and 440 may be controlled based on the first to fourth enable signals EN1 to EN4, respectively.

The first enable signal EN1 may be supplied to the first inverting converter 220 and the second enable signal EN2 may be provided to the second inverting converter 240. The third enable signal EN3 may be provided to the third inverting converter 260 and the fifth inverting converter 440 in common. The fourth enable signal EN4 may be provided to the fourth inverting converter 420.

As described above, the DC-DC converter 10 according to exemplary embodiments may include the first power supply 1000 serving as the master power supply and the second power supply 2000 serving as the slave power supply. The converters and the inverting converters included in the first and second power supplies 1000 and 2000 may be sequentially turned on while ensuring the balancing of the inductor currents in a predetermined order, based on the increase and decrease of the panel current PL. Therefore, the voltage conversion efficiency corresponding to the wide range of the panel current PL can be improved, and the power consumption and the heat generation problem can be greatly improved.

Figure 6:
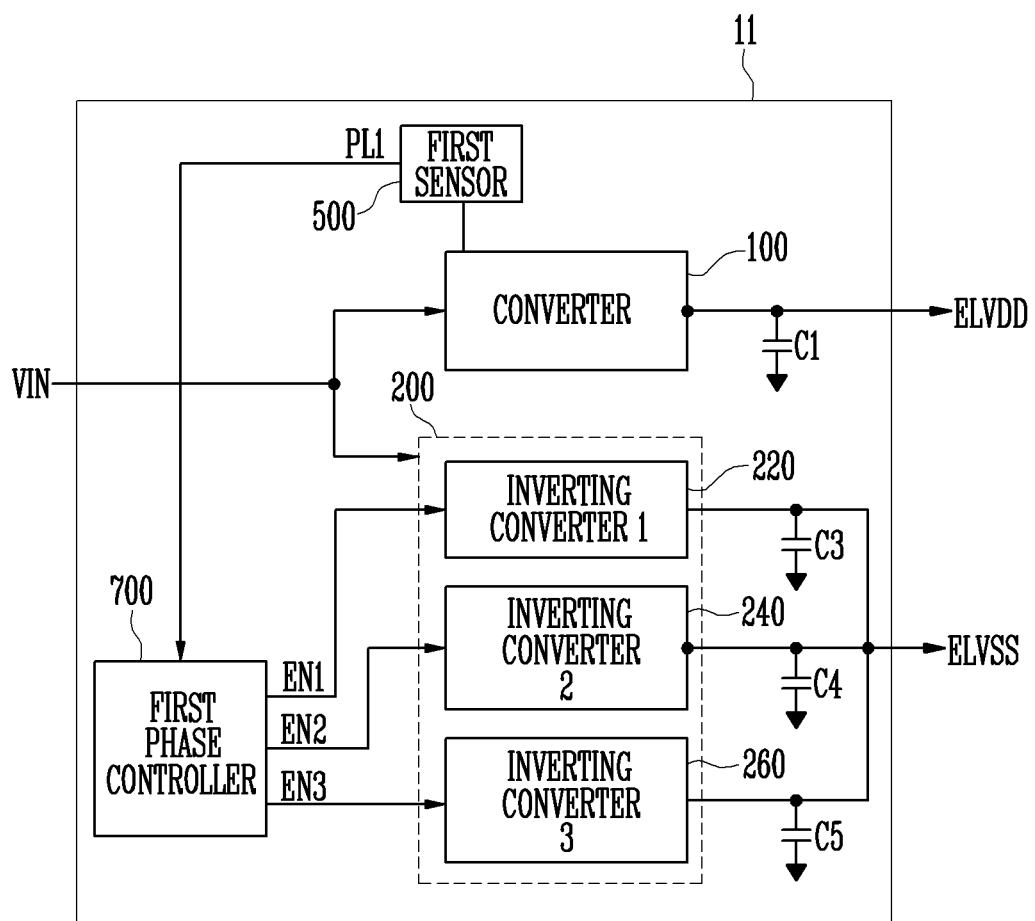
FIG. 6 is a diagram of a DC-DC converter according to an exemplary embodiment.
Figure 7:
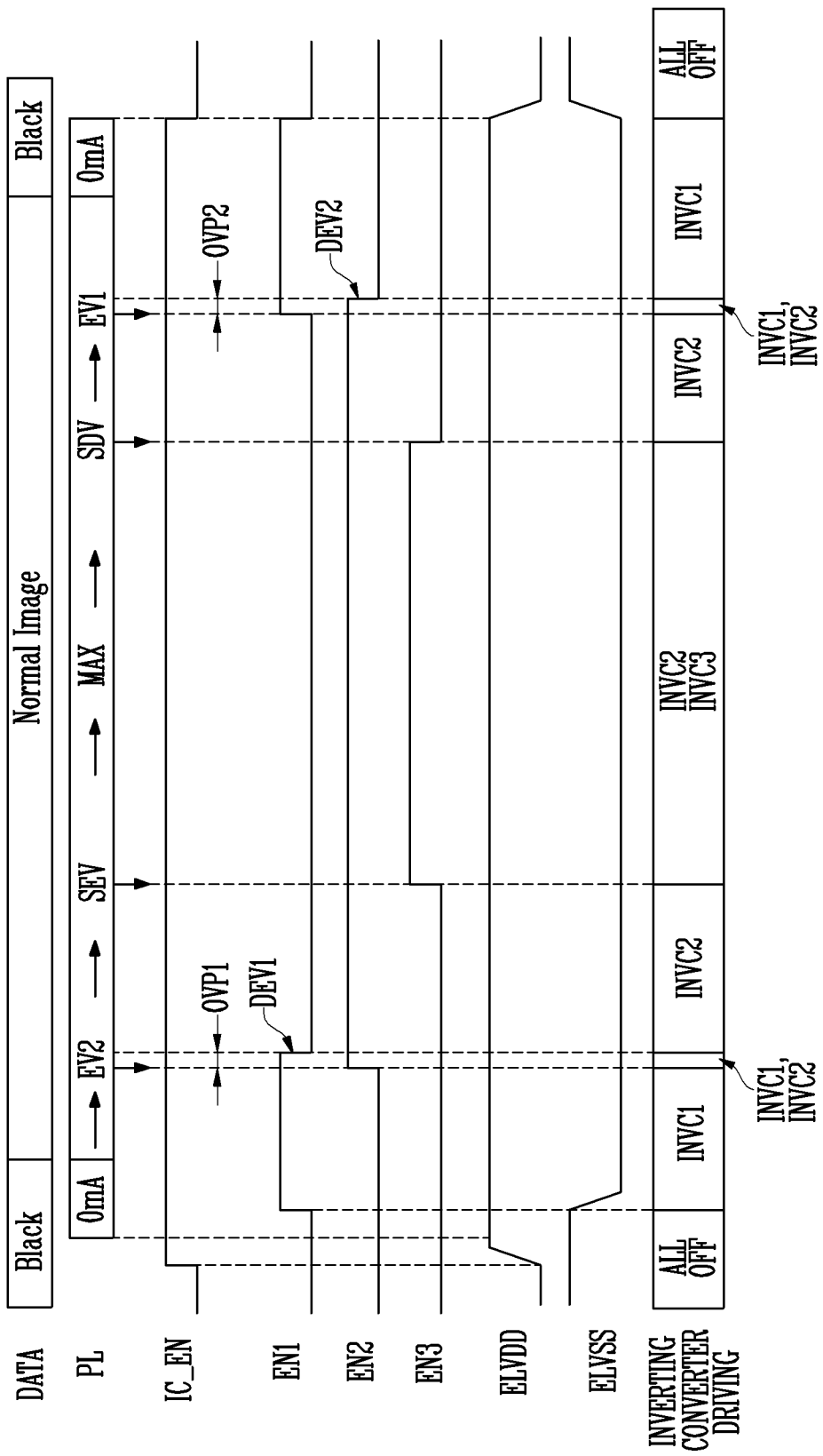
FIG. 7 is an exemplary timing diagram illustrating an operation of the DC-DC converter of FIG. 6.

FIG. 6 is a diagram illustrating an example of a DC-DC converter according to exemplary embodiments. FIG. 7 is a timing diagram illustrating an example of an operation of the DC-DC converter of FIG. 6.

The DC-DC converter according to the present exemplary embodiment is the same as the DC-DC converter and its driving method according to FIGS. 2 to 5 except that DC-DC converter includes a single power supply. Thus, the same reference numerals will be used to refer to the same or like parts as those described in the example embodiments of FIGS. 2 to 5, and any repetitive explanation concerning the above elements will be omitted.

Referring to FIGS. 6 and 7, the DC-DC converter 11 may include a single power supply. In some exemplary embodiments, the DC-DC converter 11 may include a first converter 100, a first inverting converter 220, a second inverting converter 240, a third inverting converter 260, a first sensor 500, and a first phase controller 700.

The converter 100 may output the first power voltage ELVDD regardless of the first panel current PL1.

The first to third inverting converters 220, 240 and 260 may output the second power voltage ELVSS in response to the first to third enable signals EN1, EN2 and EN3, respectively.

The first inverting converter 220 may output the second power voltage ELVSS within a current range that the first panel current PL1 is equal to or smaller than the first enable value EV1 or the first disable value DEV1.

When the first panel current PL1 increases, the first inverting converter 220 may be inactivated and the second inverting converter 240 and the third inverting converter 260 may be sequentially activated.

Figure 8:
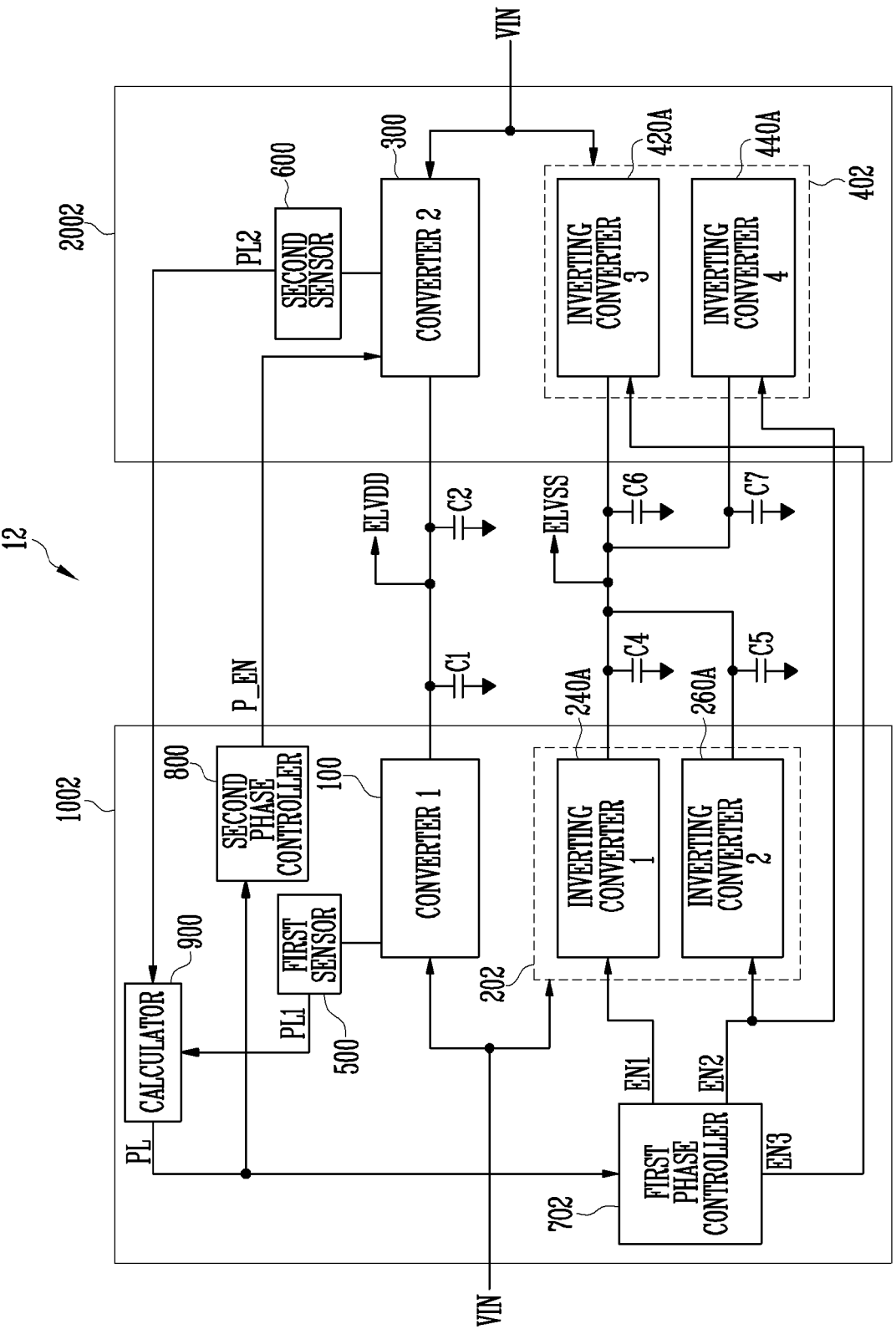
FIG. 8 is a diagram illustrating a DC-DC converter according to an exemplary embodiment.
Figure 9:
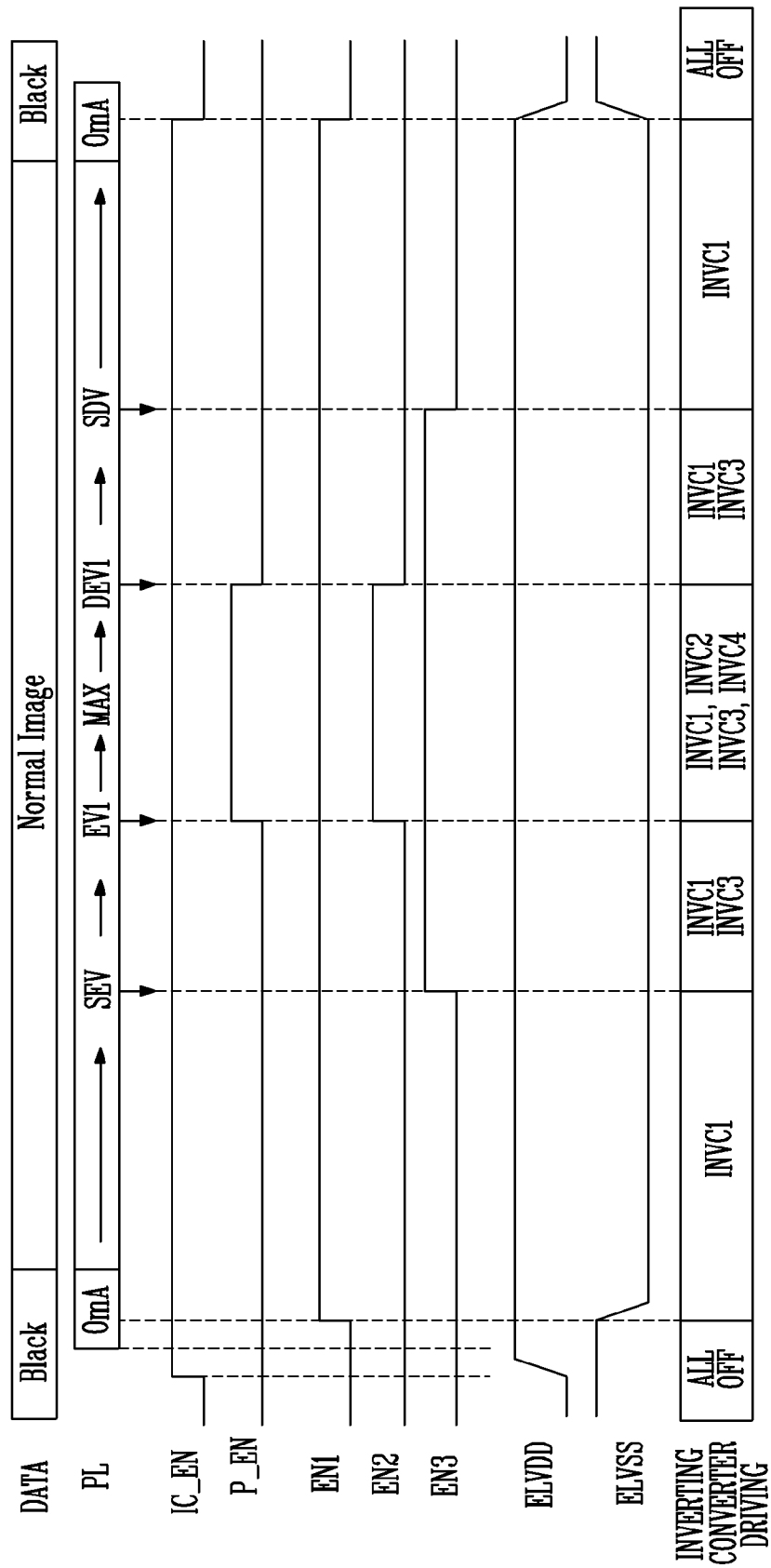
FIG. 9 is an exemplary timing diagram illustrating an operation of the DC-DC converter of FIG. 8.

FIG. 8 is a diagram illustrating an example of a DC-DC converter according to exemplary embodiments. FIG. 9 is a timing diagram illustrating an example of an operation of the DC-DC converter of FIG. 8.

The DC-DC converter according to the present exemplary embodiment is the same as the DC-DC converter and its driving method according to FIGS. 2 to 5 except for inverting converters of the first power supply. Thus, the same reference numerals will be used to refer to the same or like parts as those described in the exemplary embodiments of FIGS. 2 to 5, and any repetitive explanation concerning the above elements will be omitted.

Referring to FIGS. 8 and 9, the DC-DC converter 12 may include a first power supply 1002 and a second power supply 2002.

The first power supply 1002 may include a first converter 100, a first sensor 500, a first output group 202, a first phase controller 702, a second phase controller 800, and a calculator 900. The first power supply 1002 of FIG. 8 does not include an inverting converter (e.g., the first inverting converter 220 of FIG. 2) that is driven only in response to the low panel current PL.

The second power supply 2002 may include a second converter 300, a second sensor 600, and a second output group 402.

The first output group 202 may include first and second inverting converters 240A and 260A. The second output group 402 may include third and fourth inverting converters 420A and 440A.

The first inverting converter 240A may convert the input power VIN to the second power voltage ELVSS in response to the first enable signal EN1. The first enable signal EN1 may have an activation level regardless of the panel current PL. In some exemplary embodiments, the first enable signal EN1 may have the activation level after an IC enable signal IC_EN has the activation level, and may have an inactive level concurrently with the IC enable signal IC_EN. Therefore, the first inverting converter 240A may output the second power voltage ELVSS regardless of the panel current PL.

The second inverting converter 260A may convert the input power VIN to the second power voltage ELVSS in response to the second enable signal EN2. The second enable signal EN2 having the inactivation level may change to the activation level when the panel current PL exceeds (becomes greater than) the first enable value EV1. The second enable signal EN2 having the activation level may change to the inactivation level when the panel current PL becomes less than the first disable value DEV1. The first enable value EV1 and the first disable value DEV1 may be greater than the slave enable value SEV and the slave disable value SDV, respectively. For example, the first enable value EV1 is about 1 A, the first disable value DEV1 is about 950 mA, the slave enable value SEV is about 500 mA, the slave disable value SDV is about 450 mA.

Therefore, the second inverting converter 260A in the inactive state may be activated when the panel current PL becomes greater than the first enable value EV1, and the second inverting converter 260A in the active state may be inactivated when the panel current PL becomes less than the first disable value DEV1.

In some exemplary embodiments, the fourth inverting converter 440A may be controlled by the second enable signal EN2 together with the second inverting converter 260A. Therefore, the fourth inverting converter 440A and the second inverting converter 260A may be controlled simultaneously.

The third inverting converter 420A may convert the input power VIN to the second power voltage ELVSS in response to the third enable signal EN3. The third enable signal EN3 having the inactivation level may change to the activation level when the panel current PL exceeds (becomes greater than) the slave enable value SEV. The third enable signal EN3 having the activation level may change to the inactivation level when the panel current PL becomes less than the slave disable value SDV. For example, the slave enable value SEV may be about 500 mA and the slave disable value SDV may be about 450 mA.

The third inverting converter 420A in the inactive state may be activated when the panel current PL becomes greater than the slave enable value SEV. The third inverting converter 420A in the active state may be inactivated when the panel current PL becomes less than the slave disable value SDV.

As illustrated in FIG. 9, when the panel current PL increases, the inverting converters may be sequentially activated (e.g., in the order of the first inverting converter 240A (i.e., INVC1 of FIG. 9)->the third inverting converter 420A (i.e., INVC3 of FIG. 9)->the second and fourth inverting converters 260A and 440A (i.e., INVC2 and INVC4 of FIG. 9)). As the third inverting converter 420A is activated after the activation of the first inverting converter 240A, the second power voltage ELVSS may be output while the inductor currents are balanced. Thereafter, the second power voltage ELVSS may be output while the inductor currents are balanced as the second and fourth inverting converters 260A and 440A are simultaneously activated. Therefore, the second power voltage ELVSS may be stably output.

If the panel current PL decreases, the inverting converters may be inactivated sequentially in reverse order of the above sequence.

In some exemplary embodiments, the second converter 300 may convert the input power VIN to the first power voltage ELVDD in response to the converter enable signal P_EN. The converter enable signal P_EN may have substantially the same waveform as the second enable signal EN2. Thus, the second converter 300 may be driven simultaneously with the second and fourth inverting converters 260A and 440A.

As described above, the DC-DC converter 12 according to the exemplary embodiment of FIGS. 8 and 9 may include the first power supply 1002 having a relatively simple structure than the DC-DC converter 10 of FIG. 2, so that the manufacturing costs can be reduced.

Figure 10A:
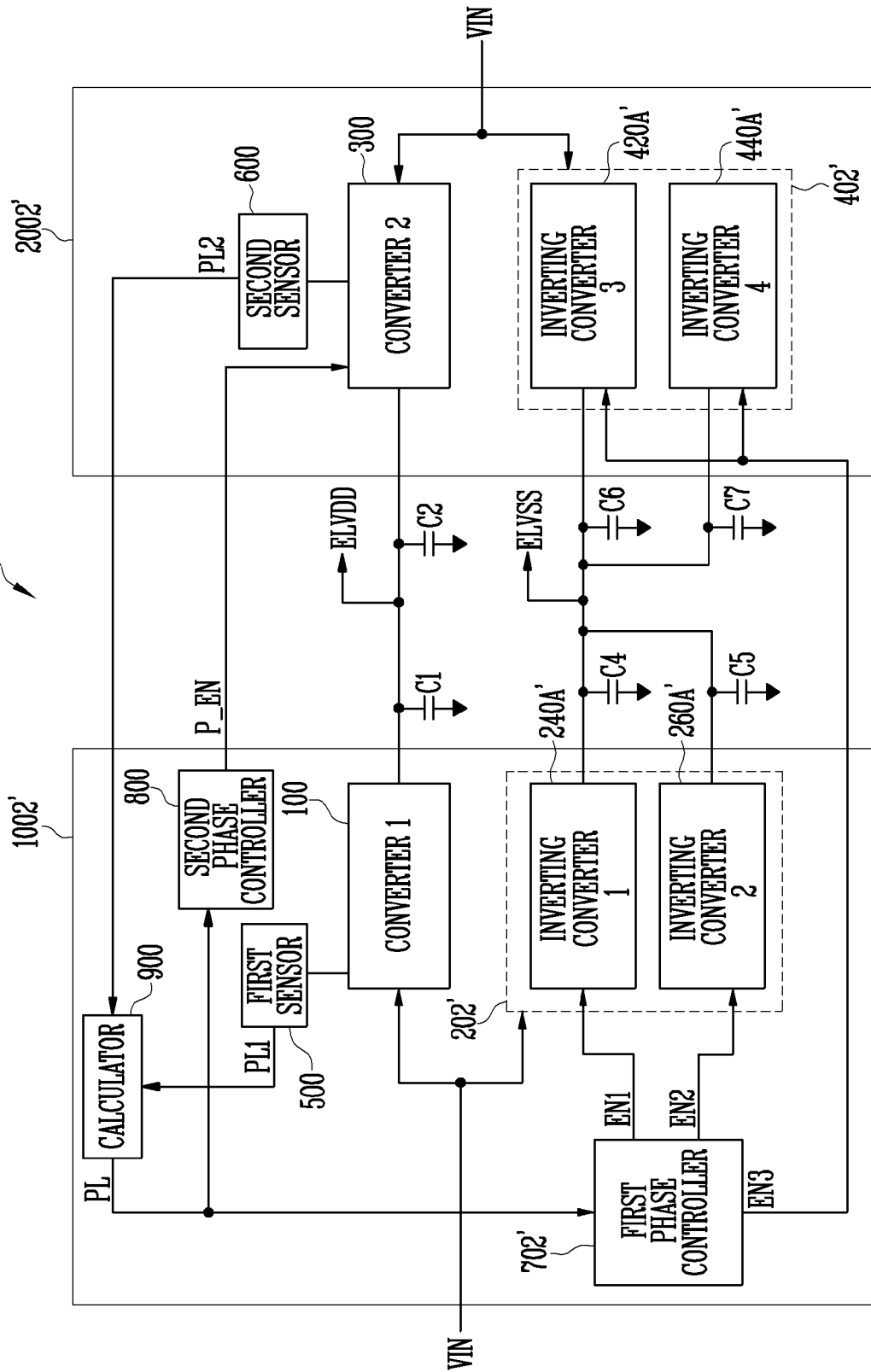
FIG. 10A is an exemplary diagram of the DC-DC converter of FIG. 8.
Figure 10B:
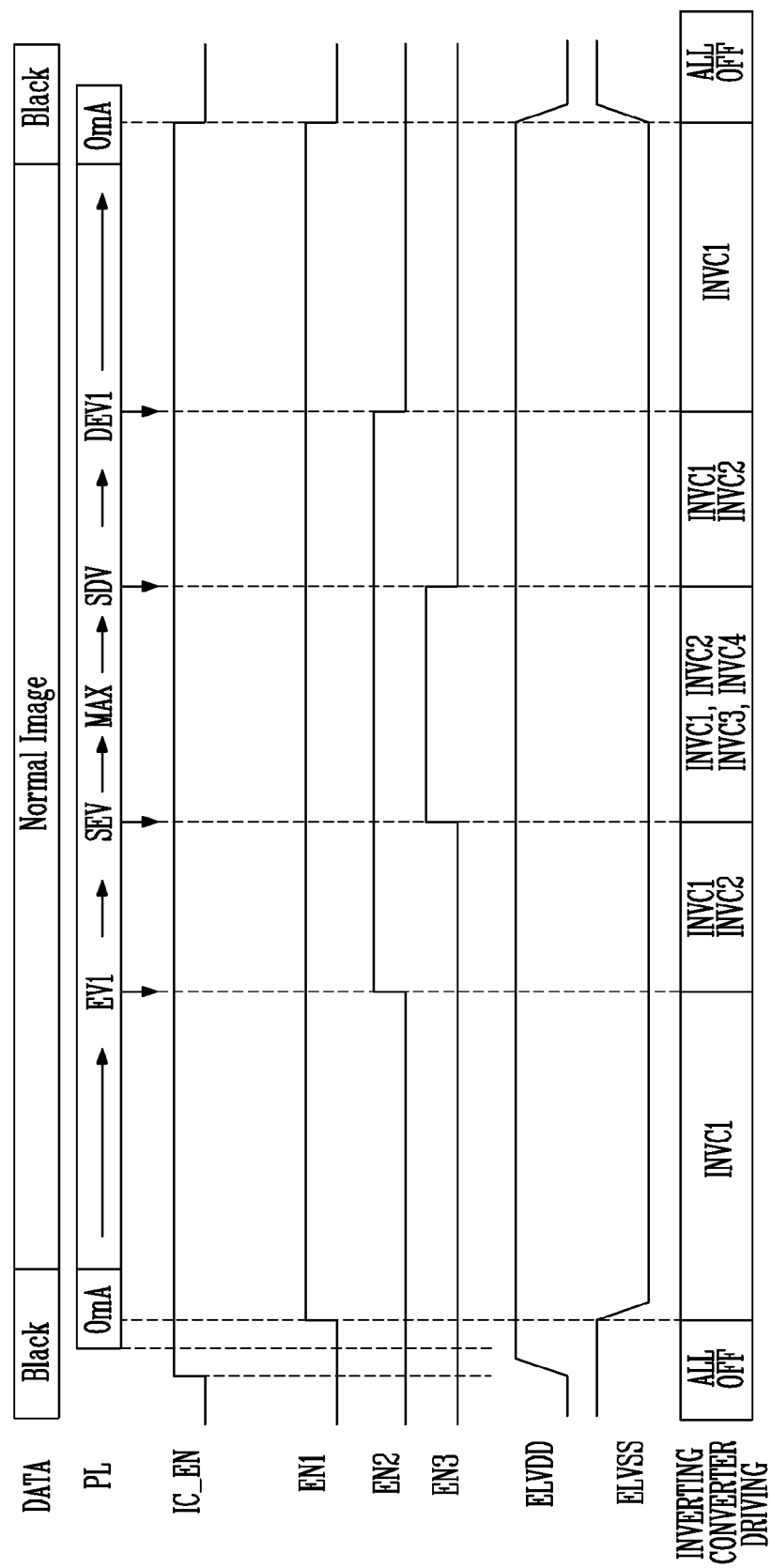
FIG. 10B is an exemplary timing diagram illustrating an operation of the DC-DC converter of FIG. 10A.

FIG. 10A is a diagram illustrating an example of the DC-DC converter of FIG. 8. FIG. 10B is a timing diagram illustrating an example of an operation of the DC-DC converter of FIG. 10A.

The DC-DC converter according to the present exemplary embodiment is the same as the DC-DC converter and its driving method according to FIGS. 8 and 9 except for the operation sequence of the inverting converters. Thus, the same reference numerals will be used to refer to the same or like parts as those described in the example embodiments of FIGS. 8 and 9, and any repetitive explanation concerning the above elements will be omitted.

Referring to FIGS. 10A and 10B, the DC-DC converter 12' may include a first power supply 1002' and a second power supply 2002'.

The first output group 202' may include first and second inverting converters 240A' and 260A'. The second output group 402' may include third and fourth inverting converters 420A' and 440A'. The first power supply 1002' may further include first and second phase controllers 702' and 800.

The first inverting converter 240A' may operates in response to the first enable signal EN1, the second inverting converter 260A' may operate in response to the second enable signal EN2, and third and fourth inverting converters 420A' and 440A' may operate in response to third enable signal EN3.

The second enable signal EN2 of the inactivation level may change to the activation level corresponding to the first enable value EV1 and the second enable signal EN2 of the activation level may change to the inactivation level corresponding to the first disable value DEV1. The third enable signal EN3 of the inactivation level may change to the activation level corresponding to the slave enable value SEV and the third enable signal EN3 of the activation level may change to the inactivation level corresponding to the slave disable value SDV. Here, the first enable value EV1 and the first disable value DEV1 may be smaller than the slave enable value SEV and the slave disable value SDV, respectively.

Thus, as shown in FIG. 10B, when the panel current PL increases, the inverting converters may be sequentially activated (e.g., in the order of the first inverting converter 240A' (i.e., INVC1 of FIG. 10B)->the second inverting converter 260A' (i.e., INVC2 of FIG. 10B)->the third and fourth inverting converters 420A' and 440A' (i.e., INVC3 and INVC4 of FIG. 10B)). That is, the second power supply 2002' may be activated after all the components of the first power supply 1002' are activated. If the panel current PL decreases, the inverting converters may be deactivated sequentially in reverse order of the above sequence.

Accordingly, in the DC-DC converter 12' according to the exemplary embodiment of FIGS. 10A and 10B, the number of channels (and pins) connecting the first power supply 1002' and the second power supply 2002' can be further reduced.

Figure 11:
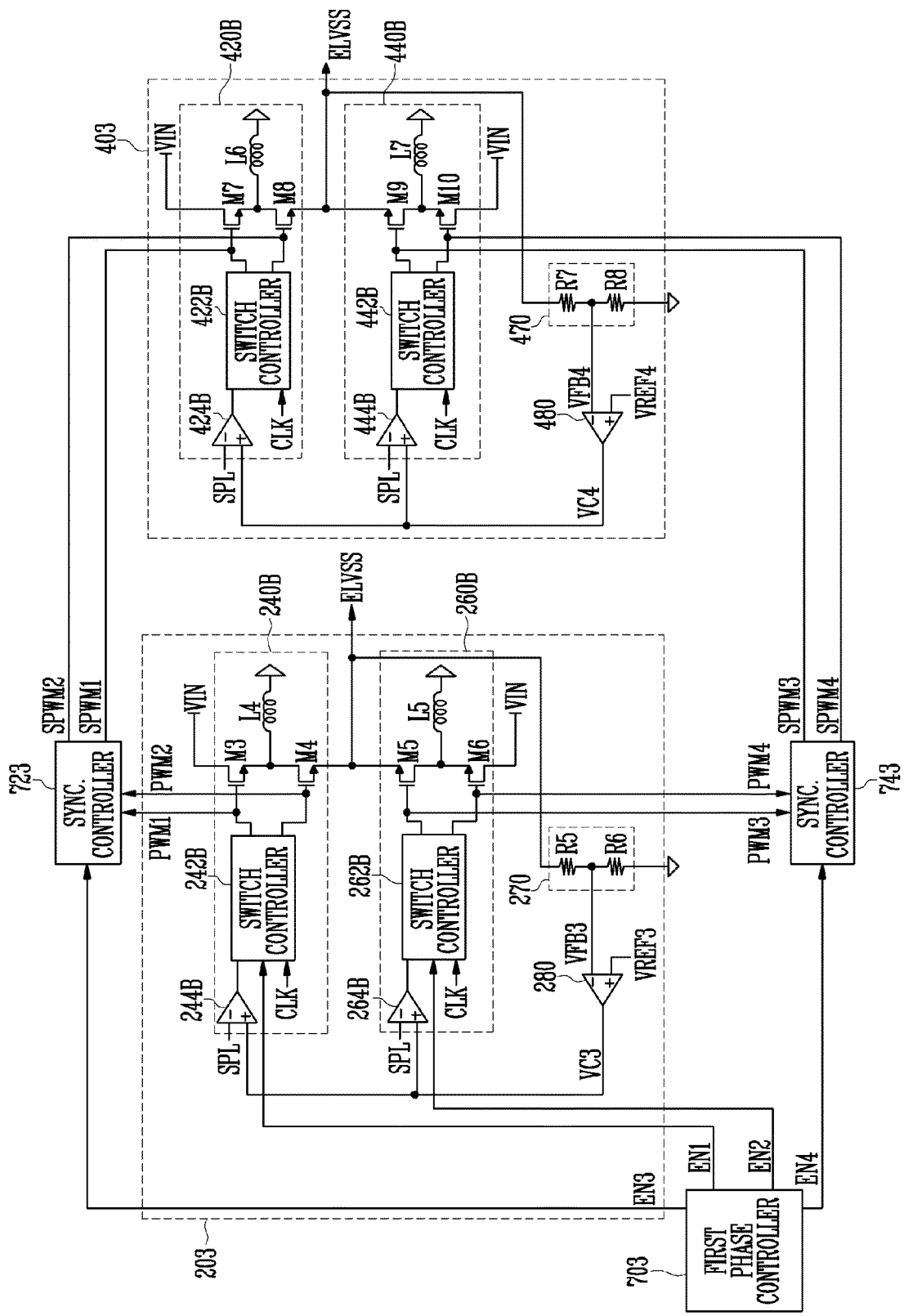
FIG. 11 is an exemplary diagram a portion of the DC-DC converter of FIG. 8.
Figure 12:
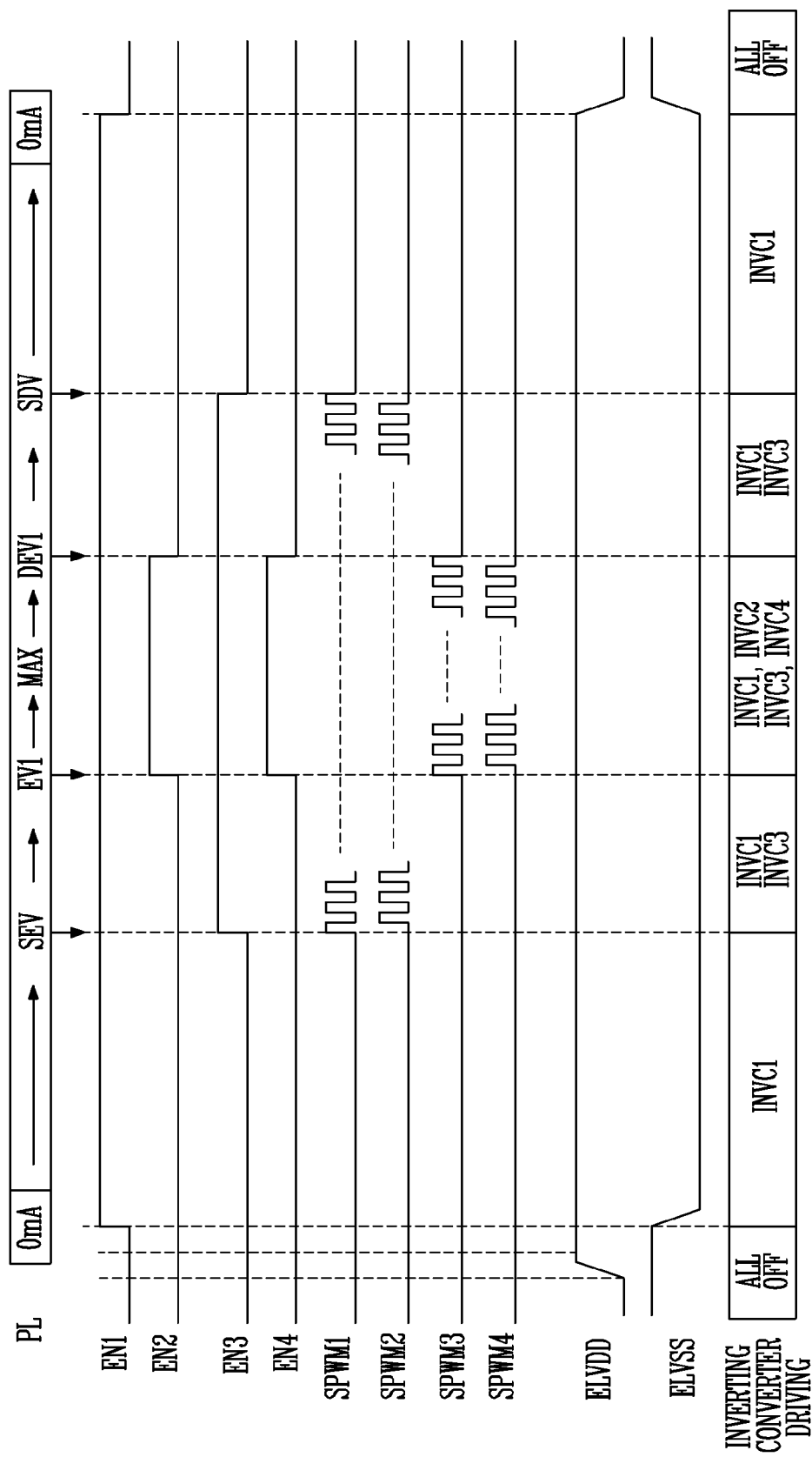
FIG. 12 is an exemplary timing diagram illustrating an operation of the DC-DC converter of FIG. 11.
Figure 13:
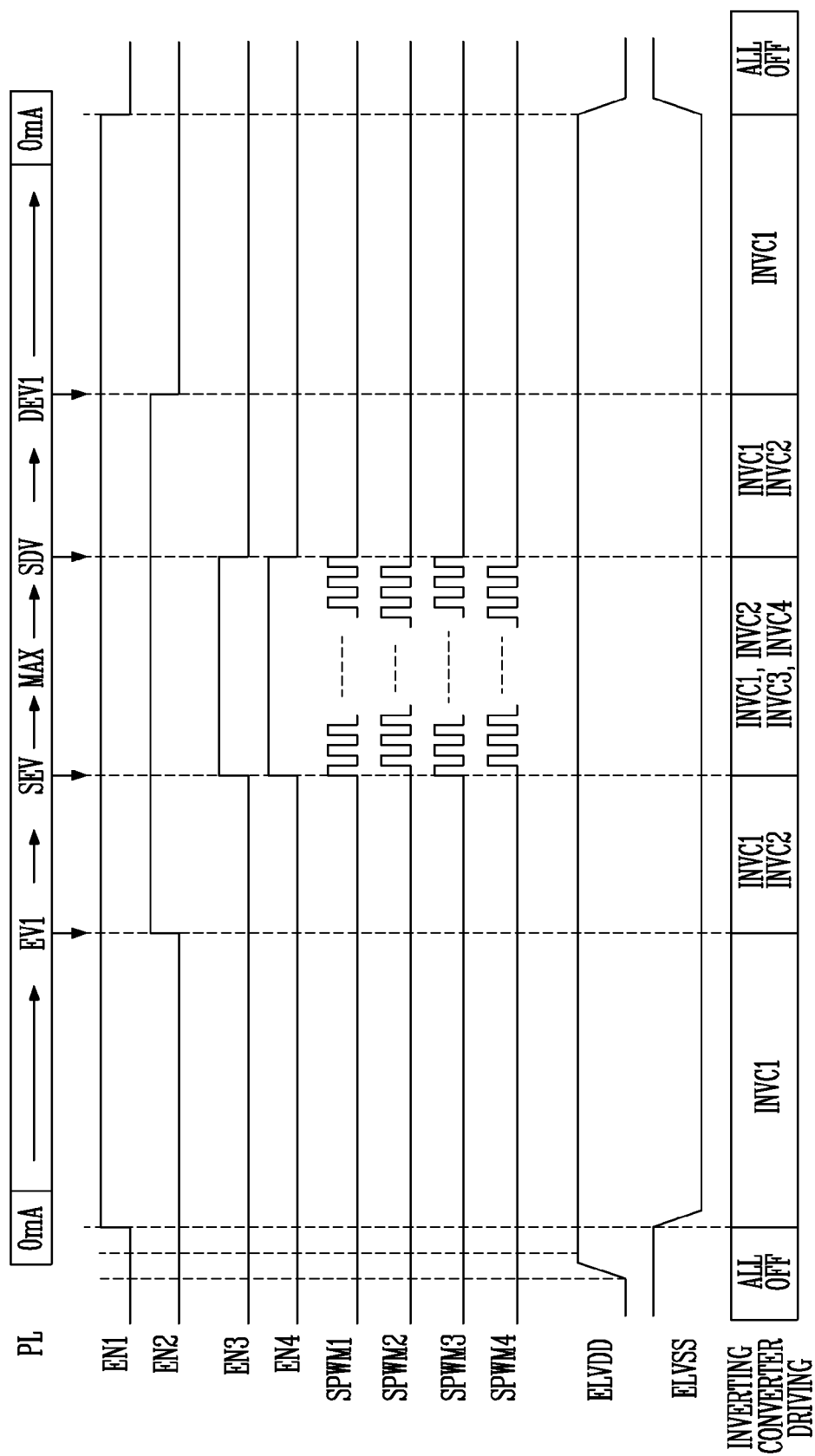
FIG. 13 is an exemplary timing diagram illustrating an operation of the DC-DC converter of FIG. 11.

FIG. 11 is a diagram illustrating an example of a portion of the DC-DC converter of FIG. 8. FIG. 12 is a timing diagram illustrating an example of an operation of the DC-DC converter of FIG. 11. FIG. 13 is a timing diagram illustrating an example of an operation of the DC-DC converter of FIG. 11.

Referring to FIGS. 8 to 12, the first phase controller 703 may include a first synchronization controller 723 and a second synchronization controller 743.

A first output group 203 may include a first inverting converter 240B, a second inverting converter 260B, a third voltage divider 270, and a third error amplifier 280. The first inverting converter 240B and the second inverting converter 260B may share the third voltage divider 270 and the third error amplifier 280.

The first inverting converter 240B may output the second power voltage ELVSS in response to the first enable signal EN1 and the second inverting converter 260B may output the second power voltage ELVSS in response to the second enable signal EN2.

The second output group 403 may include a third inverting converter 420B and a fourth inverting converter 440B, a fourth voltage divider 470, and a fourth error amplifier 480. The third inverting converter 420B and the fourth inverting converter 440B may share the fourth voltage divider 470 and the fourth error amplifier 480.

The first synchronization controller 723 may provide the PWM signals PWM1 and PWM2 output from a switch controller 242B of the first inverting converter 240B to the third inverting converter 420B in response to the third enable signal EN3. The third inverting converter 420B may output the second power voltage ELVSS in synchronization with the first inverting converter 240B by the third enable signal EN3.

For example, the first synchronization controller 723 may output synchronizing PWM signals SPWM1 and SPWM2 during an activation period of the third enable signal EN3. Accordingly, the third inverting converter 420B may operate only during the activation period of the third enable signal EN3.

The second synchronization controller 743 may provide PWM signals PWM3 and PWM4 output from the switch controller 262B of the second inverting converter 260B to the fourth inverting converter 440B in response to the fourth enable signal EN4. The fourth inverting converter 440B may output the second power voltage ELVSS in synchronization with the second inverting converter 260B by the fourth enable signal EN4.

For example, the second synchronization controller 743 may output synchronization PWM signals SPWM3 and SPWM4 during an activation period of the fourth enable signal EN4. Accordingly, the fourth inverting converter 440B may operate only during the activation period of the fourth enable signal EN4.

In some exemplary embodiments, the third inverting converter 420B may include a seventh transistor M7, an eighth transistor M8, a sixth inductor L6, a switch controller 422B, and a fifth comparator 424B.

In some exemplary embodiments, the fourth inverting converter 440B may include a ninth transistor M9, a tenth transistor M10, a seventh inductor L7, a switch controller 442B, and a sixth comparator 444B.

In some exemplary embodiments, the second and fourth enable signals EN2 and EN4 may be transited corresponding to the first enable value EV1 and the first disable value DEV1, and the third enable signal EN3 may be transited corresponding to the slave enable value SEV and the slave disable value SDV. The synchronizing PWM signals SPWM1 and SPWM2 supplied from the first synchronization controller 723 may be output in synchronization with the third enable signal EN3 and the synchronizing PWM signals SPWM3 and SPWM4 may be output in synchronization with the second enable signal EN2.

In some exemplary embodiments, the first enable value EV1 and the first disable value DEV1 may be greater than the slave enable value SEV and the slave disable value SDSV, respectively. In this case, as shown in FIG. 12, when the panel current PL increases, the inverting converters may be sequentially activated (e.g., in the order of the first inverting converter 240B (i.e., INVC1 of FIG. 12)->the third inverting converter 420B (i.e., INVC3 of FIG. 12)->the second and fourth inverting converters 260B and 440B (i.e., INVC2 and INVC4 of FIG. 12)). If the panel current PL decreases, the inverting converters may be deactivated sequentially in reverse order of the above sequence.

In some exemplary embodiments, the first enable value EV1 and the first disable value DEV1 may be less than the slave enable value SEV and the slave disable value SDV, respectively. Also, the third and fourth enable signals EN3 and EN4 may be the same. Thus, as shown in FIG. 13, when the panel current PL increases, the inverting converters may be sequentially activated (e.g., in the order of the first inverting converter 240B (i.e., INVC1 of FIG. 13)->the second inverting converter 260B (i.e., INVC2 of FIG. 13)->the third and fourth inverting converters 420B and 440B (i.e., INVC3 and INVC4 of FIG. 13)). If the panel current PL decreases, the inverting converters may be deactivated sequentially in reverse order of the above sequence.

The DC-DC converter and the method for driving the same according to the exemplary embodiments may drive the third and fourth inverting converters 420B and 440B of the second output group 403 by using the PWM signals PWM1 to PWM4 of the first and second inverting converters 240B and 260B. Thus, the driving method and structure of the DC-DC converter can be simplified.

Figure 14:
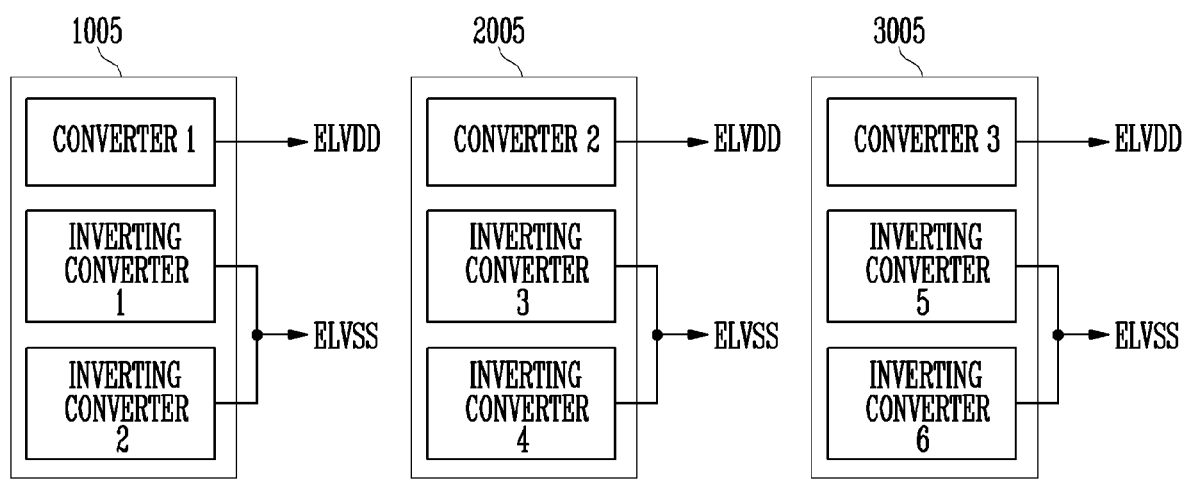
FIG. 14 is a diagram of a DC-DC converter according to an exemplary embodiment.
Figure 15:
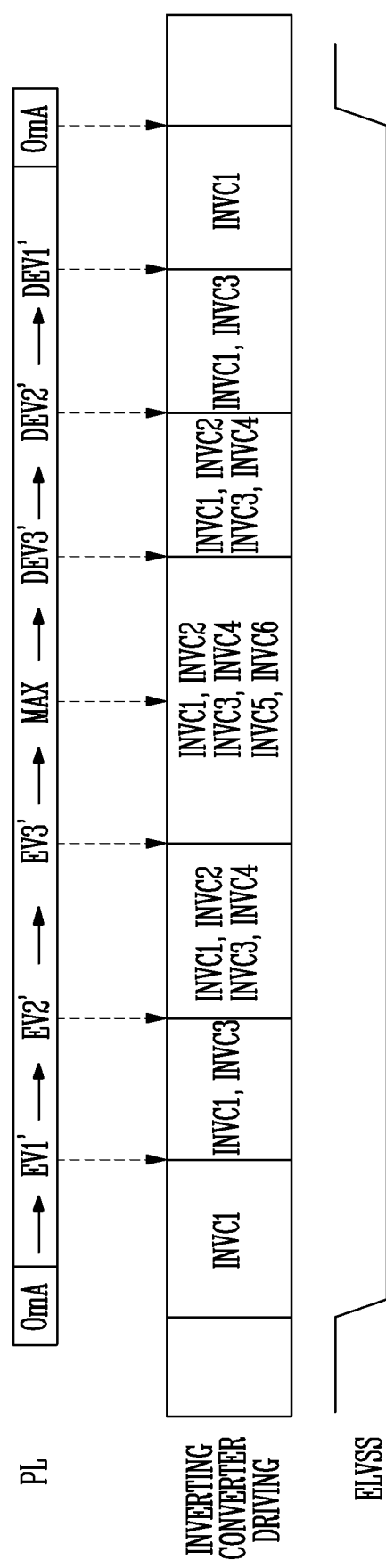
FIGS. 15 and 16 are exemplary diagrams illustrating an operation of the DC-DC converter of FIG. 14.
Figure 16:
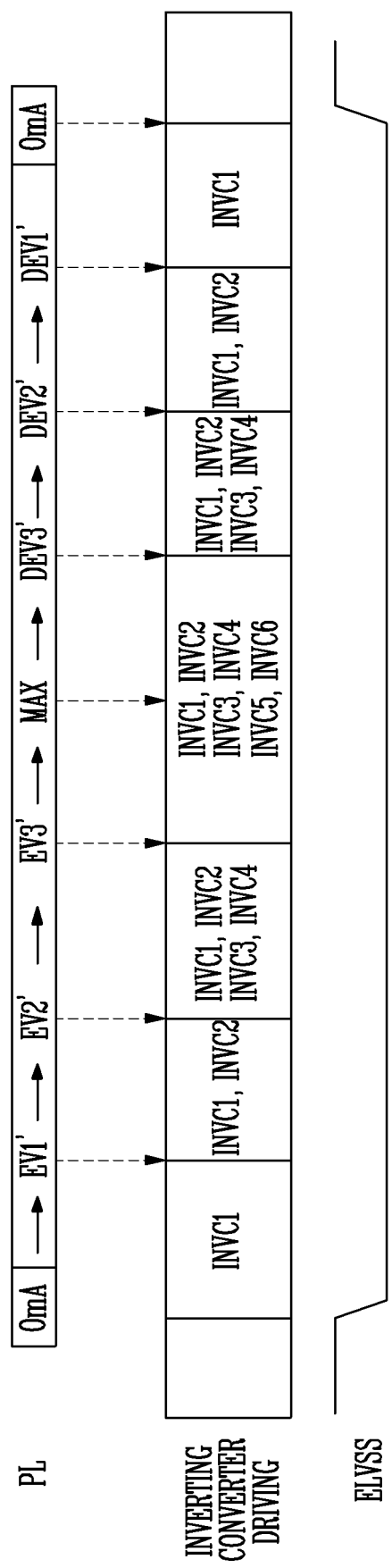

FIG. 14 is a diagram illustrating an example of a DC-DC converter according to exemplary embodiments. FIGS. 15 and 16 are diagrams illustrating examples of an operation of the DC-DC converter of FIG. 14.

The DC-DC converter according to the present exemplary embodiment is the same as the DC-DC converter and its driving method according to FIGS. 8 to 10B except for configurations where three or more power supplies are connected in a dependent manner. Thus, the same reference numerals will be used to refer to the same or like parts as those described in the example embodiments of FIGS. 8 to 10B, and any repetitive explanation concerning the above elements will be omitted.

Referring to FIGS. 14 to 16, the DC-DC converter may include first to third power supplies 1005, 2005, and 3005.

In some exemplary embodiments, the first power supply 1005 may be a master power drive chip, and the second and third power supplies 2005 and 3005 may be slave power drive chips. The second and third power supplies 2005 and 3005 may operate sequentially when the panel current PL exceeds a predetermined threshold value. The number of power supplies included in the DC-DC converter is not limited thereto.

Each of the first to third power supplies 1005, 2005, and 3005 may include one boost converter and a plurality of inverting converters.

The inverting converters may be sequentially activated in accordance with the increase of the panel current PL and may be inactivated in the reverse order of the activation as the panel current PL decreases.

In some exemplary embodiments, as shown in FIG. 15, as the panel current PL exceeds the predetermined enable values EV1', EV2', and EV3', the inverting converters may be sequentially activated (e.g., in the order of the first inverting converter INVC1, the third inverting converter INVC3, the second and fourth inverting converters INVC2 and INVC4, and the fifth and sixth inverting converters INVC5 and INVC6). Further, as the panel current PL becomes less than predetermined disable values DEV1', DEV2', and DEV3', the inverting converters may be deactivated in the reverse order.

Further, in some exemplary embodiments, as shown in FIG. 16, as the panel current PL exceeds the predetermined enable values EV1', EV2', and EV3', the inverting converters may be sequentially activated (e.g., in the order of the first inverting converter INVC1, the second inverting converter INVC2, the third and fourth inverting converters INVC3 and INVC4, and the fifth and sixth inverting converters INVC5 and INVC6). Further, as the panel current PL becomes less than predetermined the disable values DEV1', DEV2', and DEV3', the inverting converters may be deactivated in the reverse order.

As described above, the DC-DC converter according to the exemplary embodiments of the present invention may include a plurality of power supplies that output the power voltages ELVDD and ELVSS depending on the panel current. The inverting converters included in the power supplies may be activated or deactivated in a predetermined order according to the change of the panel current. Accordingly, the conversion efficiency of the power voltages ELVDD and ELVSS may be improved, and heat generation and power consumption due to unnecessary driving of the power supplies may be reduced.

The inverting converters may be sequentially turned on or off while ensuring balancing of the inductor currents. Therefore, the power voltage generation drive optimized according to the panel current may be applied, and the voltage conversion efficiency may be improved.

In addition, the power supplies may be connected in a dependent manner to distribute a current for generating the first power voltage ELVDD and a current for generating the second power voltage ELVSS, respectively, so that the DC-DC converter may be effectively applied to a wide driving current (panel current) range.

Further, the display device according to exemplary embodiments may include the DC-DC converter, so that heat generation and power consumption according to power supply may be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A DC-DC converter comprising:
a master power drive chip comprising:
a first converter configured to convert an input power to a first power voltage and to output the first power voltage to a first output terminal;
a first sensor configured to detect a panel current from an output of the first converter;
a first inverting converter configured to convert the input power to a second power voltage and to output the second power voltage to a second output terminal when the panel current is less than a first enable value;
a second inverting converter configured to output the second power voltage when the panel current becomes greater than a second enable value; and
a third inverting converter configured to output the second power voltage when the panel current becomes greater than a third enable value;
a slave power drive chip comprising:
a second converter configured to output the first power voltage when the panel current becomes greater than the third enable value;
a second sensor configured to detect the panel current from an output of the second converter;
a fourth inverting converter configured to output the second power voltage when the panel current becomes greater than a slave enable value; and
a fifth inverting converter configured to output the second power voltage when the panel current becomes greater than the third enable value; and
a phase controller configured to control operations of the first to fifth inverting converters and the second converter based on a change of the panel current, first to third enable values, and the slave enable value,
wherein slave power drive chip operates when the panel current becomes greater than the slave enable value.

2. The DC-DC converter of claim 1, wherein the first inverting converter is activated to output the second power voltage when the first and second power supplies are started, and
wherein the first inverting converter is inactivated when the panel current becomes greater than a first disable value.

3. The DC-DC converter of claim 2, wherein the first disable value is greater than the second enable value, and
wherein the second inverting converter is activated such that the first and second inverting converters generate the second power voltage, when the panel current in the activated state of the first inverting converter is in a first overlapping range between the first disable value and the second enable value.

* * * * *